(12) United States Patent
Buscema

(10) Patent No.: US 7,672,517 B2
(45) Date of Patent: Mar. 2, 2010

(54) METHOD FOR ENCODING IMAGE PIXELS A METHOD FOR PROCESSING IMAGES AND A METHOD FOR PROCESSING IMAGES AIMED AT QUALITATIVE RECOGNITION OF THE OBJECT REPRODUCED BY ONE OR MORE IMAGE PIXELS

(75) Inventor: Paolo Massimo Buscema, Rome (IT)

(73) Assignees: Bracco Imaging S.p.A., Milan (IT); Semelon, Rome (IT)

( * ) Notice: Subject to any disclaimer, the term of this patent is extended or adjusted under 35 U.S.C. 154(b) by 1113 days.

(21) Appl. No.: 10/516,879

(22) PCT Filed: Mar. 10, 2003

(86) PCT No.: PCT/EP03/02400

§ 371 (c)(1),
(2), (4) Date: Dec. 13, 2005

(87) PCT Pub. No.: WO03/077182

PCT Pub. Date: Sep. 18, 2003

(65) Prior Publication Data

US 2006/0098876 A1    May 11, 2006

(30) Foreign Application Priority Data

Mar. 11, 2002  (EP) .................... 02425141

(51) Int. Cl.
G06K 9/36 (2006.01)

(52) U.S. Cl. ...................... 382/232; 382/162

(58) Field of Classification Search .................. 382/232, 382/253, 162; 708/203
See application file for complete search history.

(56) References Cited

U.S. PATENT DOCUMENTS

| 4,776,025 A | 10/1988 | Hosoda |
| 6,238,342 B1 | 5/2001 | Feleppa et al. |
| 6,324,300 B1 | 11/2001 | Doll |

OTHER PUBLICATIONS

N. Petrick et al., "Automated Detection of Breast Masses on Mammograms Using Adaptive Contrast Enhancement and Texture Classification", Medical Physics, American Institute of Physics, vol. 23, No. 10, Oct. 1, 1966, New York, USA, pp. 1685-1696 (cited in search report).

*Primary Examiner*—Brian Q Le
*Assistant Examiner*—Edward Park
(74) *Attorney, Agent, or Firm*—Themis Law

(57) ABSTRACT

A method for encoding pixels of digital or digitized images, i.e., images consisting of a set of image dots, named pixels in two-dimensional images and voxels in three-dimensional images, each of said pixels or voxels being represented by a set of values which correspond to a visual aspect of the pixel on a display screen or in a printed image. According to the invention, the pixels or voxels of at least one portion of interest of the digital or digitized image or each pixel or voxel of the set of pixels or voxels which form the image is uniquely identified with a vector whose components are given by the date of the pixels or voxels to be encoded and by the data of at least one or at least some or of all of the pixels around the pixels to be encoded and arranged within a predetermined subset of pixels or voxels included in the whole set of pixels or voxels which form the image.

38 Claims, 12 Drawing Sheets

Recognition of benign/Malignat Tissues

| Imaging (NMR) Breast Cancer- Prediction REsults | | | | | | | |
|---|---|---|---|---|---|---|---|
| ANN | Malignant | Benign | Sensitivity | Specificity | Arit Av | Pond Av | Errors |
| MetaGen1 | 99.43 | 98.22 | 99.57 | 97.65 | 98.83 | 99.19 | 7 |
| MetaGen | 99.28 | 98.22 | 99.57 | 97.08 | 98.75 | 99.08 | 8 |
| MetanetAf | 99.00 | 97.04 | 99.28 | 95.91 | 98.02 | 98.62 | 12 |
| FF_Bm | 98.85 | 97.04 | 99.28 | 95.35 | 97.95 | 98.50 | 13 |
| MetaBayes | 99.00 | 96.45 | 99.14 | 95.88 | 97.72 | 98.50 | 13 |
| MetanetBp | 98.85 | 97.04 | 99.28 | 95.35 | 97.95 | 98.50 | 13 |
| MetanetCm | 98.71 | 97.04 | 99.28 | 94.80 | 97.88 | 98.39 | 14 |
| FF_Sn | 98.71 | 96.45 | 99.14 | 94.77 | 97.58 | 98.27 | 15 |
| TasmSABp | 98.57 | 97.04 | 99.28 | 94.25 | 97.80 | 98.27 | 15 |
| TasmSASn | 98.71 | 96.45 | 99.14 | 94.77 | 97.58 | 98.27 | 15 |
| FF_Bp | 98.71 | 95.86 | 98.99 | 94.74 | 97.28 | 98.15 | 16 |
| FF_Cm | 97.71 | 97.63 | 99.42 | 91.16 | 97.67 | 97.69 | 20 |

Recognition of Benign/Malignant Tissue

Recognition of Benign/Malignant/Normal Tissues

Imaging (NMR) Breast Cancer Results of the Prediction

| ANN | Benign | | | Malignant | | | Normal | | | Global | | |
|---|---|---|---|---|---|---|---|---|---|---|---|---|
| | Num | Err | %Cor | Num | Err | %Cor | Num | Err | %Cor | Tot | Errors | %Arit | %Pond |
| FF_Bp | 169 | 19 | 88.76 | 698 | 50 | 92.84 | 16317 | 181 | 98.89 | 17184 | 250 | 93.49 | 98.55 |
| FF_Sn | 169 | 13 | 92.31 | 698 | 36 | 94.84 | 16317 | 184 | 98.87 | 17184 | 233 | 95.34 | 98.64 |
| FF_C | 169 | 12 | 92.90 | 698 | 51 | 92.69 | 16317 | 90 | 99.45 | 17184 | 153 | 95.01 | 99.11 |
| MetanetBaye | 169 | 20 | 88.17 | 698 | 85 | 87.82 | 16317 | 34 | 99.79 | 17184 | 139 | 91.93 | 99.19 |
| MetanetB | 169 | 26 | 84.62 | 698 | 31 | 95.56 | 16317 | 110 | 99.33 | 17184 | 167 | 93.17 | 99.03 |
| MetanetA | 169 | 5 | 97.04 | 698 | 88 | 87.39 | 16317 | 146 | 99.11 | 17184 | 239 | 94.51 | 98.61 |
| MetaGe | 169 | 7 | 95.86 | 698 | 25 | 96.42 | 16317 | 121 | 99.26 | 17184 | 153 | 97.18 | 99.11 |
| MetaGen | 169 | 7 | 95.86 | 698 | 24 | 96.56 | 16317 | 122 | 99.25 | 17184 | 153 | 97.22 | 99.11 |
| MetanetC | 169 | 55 | 67.46 | 698 | 55 | 92.12 | 16317 | 56 | 99.66 | 17184 | 166 | 86.41 | 99.03 |

Breast Cancer Results of the Prediction (%Pond. Average)

Recognition of all the five Classes of Tissues

Imaging (NMR) Breast Cancer- Results of the Prediction

| Classes | LDA | Sn | Bm | Bp | Cm | MetaBp | MetaAf | MetaCm | MetaBayes |
|---|---|---|---|---|---|---|---|---|---|
| Benign | 82.84 | 94.08 | 93.49 | 93.49 | 90.53 | 96.45 | 95.27 | 92.90 | 92.31 |
| Malignant | 74.93 | 90.11 | 91.83 | 92.84 | 91.12 | 95.13 | 95.13 | 93.27 | 93.12 |
| Normal | 82.92 | 95.74 | 95.93 | 95.69 | 96.91 | 95.11 | 95.28 | 97.23 | 97.21 |
| Background | 95.44 | 99.62 | 99.59 | 99.34 | 99.47 | 99.67 | 99.67 | 99.65 | 99.70 |
| Muscular | 94.21 | 97.88 | 97.17 | 97.38 | 96.98 | 98.57 | 98.78 | 97.46 | 97.63 |
| AVG | 86.07 | 95.49 | 95.60 | 95.75 | 95.00 | 96.99 | 96.82 | 95.10 | 95.99 |
| Pond AW | 88.90 | 97.10 | 96.96 | 96.90 | 97.22 | 97.22 | 97.35 | 97.65 | 97.70 |
| Errors | 1907 | 509 | 526 | 582 | 478 | 477 | 466 | 404 | 396 |

Breast Cancer Results of the Prediction
ERRORS

METHOD FOR ENCODING IMAGE PIXELS A METHOD FOR PROCESSING IMAGES AND A METHOD FOR PROCESSING IMAGES AIMED AT QUALITATIVE RECOGNITION OF THE OBJECT REPRODUCED BY ONE OR MORE IMAGE PIXELS

A method for encoding image pixels, a method for processing images and a method for processing images aimed at qualitative recognition of the object reproduced by one or more image pixels The invention first relates to a method for encoding pixels of digital or digitized images, aimed at making the information content of each pixel available to automatic image processing systems, particularly designed for image recognition with reference to the objects reproduced therein.

The term digital is intended to define an image obtained by imaging apparatuses whose output is an image in digital format, i.e. digital cameras, Nuclear Magnetic Resonance imaging apparatuses, ultrasound imaging apparatuses and other imaging apparatuses.

The term digitized images is related to images obtained by substantially analog systems, providing an analog image which is further scanned by means of devices known as scanners, regardless of whether the latter are hardware devices, i.e. devices for reading an image which is physically printed on a medium, or software devices, i.e. designed to sample an image, provided in the form of set of signals and to turn it into digital signals.

The increasingly extensive use of digital images allows to have said images in the form of numerical data, ready for further processing.

Regardless of whether the image is directly obtained digitally or acquired in an analog manner, by traditional systems, to be further digitized, e.g. scanned by digitizing devices, i.e. scanners, a digital image is composed of a set of image dots, the so-called pixels, which may have different brightness conditions, i.e. different gray scale tones and, in color images, different colors. Each pixel of an image also has a well-defined position whereby the digital image may be represented by a two- or three-dimensional matrix of elements $P_{i,j}$, each corresponding to a predetermined pixel of the pixel set that forms the image, the element $P_{i,j}$ being a variable which assumes the brightness and/or color value associated to the specific pixel.

When the range is restricted to black and white images, the different pixel-associated brightness values are represented by a gray scale extending from black to white through several different intermediate gray levels, whose number may be user-defined, based on the capabilities of the digitized imaging apparatus and/or of the display device.

In the case of a three-dimensional matrix, the discrete image unit element is generally referred to as a voxel and the three-dimensional matrix is composed of elements $V_{i,j,k}$.

Therefore, from the technical point of view, a digital image has a unique equivalent in the form of a data matrix which forms a virtual image and, as such, has a structure that is potentially adapted for image processing by systems or methods which use algorithms, whether provided by software loaded in computers or by dedicated hardware for accomplishing specific functions on the image matrix.

Nevertheless, from a logical point of view, the information contained in each isolated pixel $P_{i,j}$ or voxel $V_{i,j,k}$ provides nothing but the simple indication of its brightness value, i.e. the gray scale value corresponding thereto, hence it has no meaning wherefrom image information may be extracted, and only acts as data for controlling the display device, which may be and actually is handled during the imaging process to adjust the general aspect of the image, e.g. contrast and/or brightness and/or specific color as defined based on user-selected functions, depending either on objective or subjective data.

The image obtained thereby, as regards the shapes and characteristics of the objects reproduced by pixels in the different image portions derives from the relation of each image pixel with the surrounding pixels. Therefore, in order to allow image processing to not only adjust the individual pixels to improve the quality of the displayed image, it is necessary to define the relations between each pixel and the pixels around it. At present, no rule exists to determine such relations, except those defined on the basis of assumptions or presumptively defined rules, based on the specific characteristics of the objects reproduced by the image.

Therefore, the invention is based on the problem of providing a method for encoding image pixels, which allows to account for the relations of each pixel with the pixels around it, substantially regardless of the peculiar characteristics of the object specifically reproduced in the image, i.e. a method that can be used to provide an image data set, particularly adapted for an image processing procedure aimed at recognizing at least some characteristics of the objects represented in the image, as well as of the shapes of these objects.

An additional object is to provide an encoding process as mentioned above, which is simple and requires neither complex processing steps, nor long processing times, and does not cause the hardware required to store the encoded data to be overloaded.

The invention achieves the above purposes by providing a method for encoding pixels of digital or digitized images, wherein each pixel of the pixel set which forms the image is uniquely identified with a vector whose components are given by the data of the pixel to be encoded and by the data of at least one or at least some or at least all of the pixels around the pixel to be encoded, which pixels are disposed within a predetermined subset of pixels included in the total set of pixels that form the image.

As a first approximation, the components of the pixel identifying vector are determined by selecting, as pixels surrounding the pixel to be identified, all the pixels that are directly adjacent to said pixel to be encoded.

The components of a pixel identifying vector may be also extended to at least one or at least some or all of the pixels which surround the pixels directly adjacent to the pixel to be encoded.

Theoretically, no limit is imposed to the number and position of pixels around the pixel to be identified, which may be used to define the components of the pixel identifying vector.

The components of the identification vector corresponding to the pixel to be identified and to the surrounding pixels are arranged in such a manner as to reflect the arrangement of the pixels within the pixel matrix which forms the image, with reference to a predetermined pixel reading sequence, for forming said vector.

Particularly, the components of the identification vector, corresponding to the pixel to be identified and to the surrounding pixels are arranged in such a manner as to correspond to the distance relation of said pixels with one another and with the pixel to be encoded, with reference to a predetermined pixel reading sequence, for forming said vector.

The components of the identification vector are arranged in such a manner that the pixel to be identified has a central position which corresponds to the one taken in the image pixel set, obviously as related to the surrounding pixels, which pixel set has been selected for determining the identification vector components.

The methods includes the generation of an identification vector for each pixel which forms the digital or digitized image.

By this arrangement, the virtual image composed of a data matrix which corresponds to a set of virtual pixels, i.e. a set of data having the same position as that of real, actually displayed image pixels, is turned into a matrix in which each element has, at a certain pixel location, the identification vector therefor, which in turn has the numerical structure as defined above.

Since the identification vector includes components given by the data associated to a certain predetermined number of pixels surrounding the pixel to be identified, the latter is defined not only by the numerical value corresponding to the brightness thereof, but also by the numerical values that correspond to the brightness of the surrounding pixels, which were selected to form the identifying vector components. Hence, the matrix of pixels, i.e. of brightness data associated to the pixels is changed into a set of vectors.

The pixel identifying vector may be also extended to other components, e.g. the values of the selected pixels and of the pixel to be identified at different instants of time. This is advantageous when, for instance, different digital or digitized images of the same frame, acquired at different instants, are available. In this case, the vector will be associated to a succession of different sets of components, comprising the value of the pixel to be identified and the values of the selected pixels around it, each set being determined by an image acquired or referred to the same frame at different acquisition instants.

Preferably, the component sets are ordered within the identification vector in a succession corresponding to the time sequence of capture thereof.

The above clearly shows that the encoding method of the invention, besides allowing to identify each pixel based on its numerical value and on the relation of said pixel to a certain number of surrounding pixels, also extends this identification to the time variation of said pixel to be identified and to the time variations of the relations of said pixel to be identified to the selected surrounding pixels. Thanks to the encoding method according to the invention, a numerical description may be provided for each image pixel, even for sequences of images representing moving objects, any change caused by the movement of the object being contained in the identification vector.

The method as described above may be easily implemented both for two- and three-dimensional imaging. In the latter case, the number of components of the identification vector considerably increases, in a cubic progression, if all the pixels which form the increasingly distant shells around the pixel to be identified are to be accounted for.

The pixel selection pattern around the pixel to be identified and whose data shall form the components of the identifying vector may vary depending on actual needs.

According to a further embodiment of the method for encoding image pixels, instead of considering as the relevant minimum image surface to be coded only one pixel a group of adiacent pixels may be considered. In a square sub matrix of pixels for coding, the minimum image area to be coded can be formed by the four center pixels of the said sub matrix. In this case the at least one value assigned to the group of four pixels in the coding vector or matrix is formed by a linear or non linear combination of the brightness of the said four adiacent pixels.

The value of the group of pixels to be coded as the minimum image area may be a combined value comprising several parameters each one considering for example a linear or non linear combination of the brightness of the said four grouped pixels, such like a mean value of the brightness of the four grouped pixels, and statistical values such as brightness variance of the four grouped pixels. As numerical values of the said grouped pixels considered a minimum image area also the colour values of the four grouped pixels might be considered if the image is a clour image and even the variation relatively to time of the said brightness and cloir values. Also color values of the grouped pixels might be in the form as a linear or non linear combination of the color values of the single pixels of the group and/or to values corresponding to statistical parameters such as variance or the like.

The variation of the brightness values and or of the color values of the grouped pixels might be considered as the variations relatively to time of the linear or non linear combinations, such as mean values or other statistical parameter elatively to time.

In the identification or coding vector for such a minimum image area formed by a certain number, for example four grouped pixels, might comprise similarly to the above described identification vector the brightness and or color values and/or their variation relating to time of a certain number of surrounding pixels.

In this case of a minimum image area to be coded to alternatives might be choosen. In the first one each selected pixel surrounding the grouped pixels forming the minimum image area to be coded is considered alone or per se.

In a second alternative embodiment the selected surrounding pixels are grouped similarly to the ones to be coded thus forming surrounding minimum image zones the values of this surrounding image zones being defined by linear or non linear combination or by other statistical functions of the brightness of the signle pixels being grouped as a minimum image surrounding zone.

The above disclosed embodiment has the advantage to reduce calculation time in the case the pixels are very small relatively to the subject reproduced by the image, so that within the area of only one pixel no variation of the structure of the imaged subject may occur.

The invention also relates to an image processing method, particularly aimed at recognizing objects and/or object shapes, in an image in which pixels are encoded into identification vectors.

The method for processing digital or digitized images includes the following steps:

Encoding different digital or digitized images into pixel identifying vectors, with image objects being identified for the selected types and qualities, and associating each identification vector to the corresponding known type of object or to the known quality that are actually reproduced by each pixel identified by said identification vector, with reference to a predetermined list of different types or qualities.

Generating a teaching database for an expert processing system, comprising the binomials Formed by said identification vectors and by the associated type or quality of the reproduced object;

Actually teaching the expert processing system, by entering the teaching database therein;

Encoding the pixels of a not otherwise evaluated image by identification vectors associated to each pixel;

Entering said image pixel identifying vectors in the processing system to obtain, at the output of said processing system and as a result of the processing, the type or quality of the object represented by the image pixels.

The process of recognizing a quality or a type of object and assigning it to a pixel identifying vector is not complex, because it only is a comparison. The difficulty lies in the great number of pixels, hence of the vectors to be compared, and in that the vectors have a considerable number of components. When accounting for the processing time, however fast, of each step in which the identification vector for a pixel to be recognized is compared with the identification vectors for pixels included in the basic knowledge or teaching database for the expert system, total times are extremely long and unacceptable in practice. This field of application is particularly suitable for particular processing algorithms and more precisely for the well-known neural networks.

Nevertheless, it shall be understood that, while the use of a neural network as a processing system is the preferred embodiment, the invention is not limited to said algorithm, but may address any type of algorithm for comparing the identification vectors of the image pixels to be processed with the teaching database, such as a discretizing algorithm which makes a dull comparison and decides whether the identification vector belongs to one or the other type of object or feature amongst the various possibilities.

As will be apparent hereafter, the pixel encoding method according to this invention provides highly reliable and accurate results, i.e. higher than is currently expected.

These algorithms can rapidly converge toward the correct solution or to a solution to be statistically considered as the best possible solution, by also accounting for the considerable variances of the identification vectors for the same object type or quality.

The result provided by the expert processing system may be viewed by simply printing or displaying a list. As an alternative thereto or in combination therewith, the processing result may be highlighted by associating a color to each type or quality and by representing the solution over the digital or digitized image with each pixel of the digitized image being assigned the color of the corresponding type or quality of the represented object, as determined by the expert processing system.

It shall be noted that the teaching step, based on either different images of the same frame at different times or on images of different frames or objects whose type or quality is one of the predetermined options, allows the expert processing system, particularly a so-called neural network to learn what the aspect of the identification vector should be for a particular object or a particular quality with the highest variance of this aspect.

It shall be also understood that the recognition of the reproduced objects and/or qualities is independent from the global processing of the image and that it is performed pixel after pixel with no reference to what the pixel set represents within the image.

These two characteristics are of basic importance. By providing as much variance as possible for the identification vectors for pixels that represent a certain object type or quality, the processing system is allowed to recognize more accurately and reliably whether an identification vector, hence a pixel, belongs to a certain type of object or to a certain quality.

Pixel-based processing allows to substantially unlink the recognition of a pixel identifying vector as belonging to a certain object type or quality from the imaged subject.

The image processing method provides other advantages.

A first additional advantage consists in that the list of object types or qualities may be modified anytime, i.e. restricted or extended, without affecting the previous teaching process, by simple integration in the teaching database for the processing system. It is also possible to restrict image processing to only recognize some of the types or qualities of the imaged object among all the qualities or types of the teaching database, without affecting any further extension thereof.

Moreover, with use, the database including the knowledge acquired by the system may be increased, thereby improving knowledge, expertise hence reliability and accuracy of the processing system.

Objective evaluation of pixel characteristics allows to avoid any human image recognition and interpretation errors.

By a targeted selection of the object types and/or qualities to be recognized and the generation of adequate teaching databases, the same processing system may be used to accomplish different functions.

Besides simply recognizing object types or qualities, it is possible to generate teaching databases which allow to correct defocused images or accurately overlay two digital images of the same subject, acquired with different imaging methods, e.g. by Nuclear Magnetic Resonance imaging, ultrasound imaging or radiographic or photographic imaging.

Yet another advantage provided by the recognition method of this invention consists in allowing to limit image definition during acquisition, thereby obtaining identical or even better results as regards the possibility to evaluate the acquired image thanks to a better and more accurate recognition allowed by the method, as compared with human eye potential. This provides an important advantage, a lower resolution involving a reduced duration of imaging, e.g. by Nuclear Magnetic Resonance or by ultrasounds or other similar means. This not only allows to reduce the costs required for fast imaging and image reconstruction apparatuses, but also has positive implications, namely for the comfort of the patient, who does not have to keep still for very long times.

A particular application of the image recognition method of the invention consists in the automatic recognition of tissue types from the diagnostic images acquired by Nuclear Magnetic Resonance imaging, ultrasound imaging, radiography, etc.

In this case, the method includes the following steps:

generating a database for teaching the expert processing system based on pixel identifying vectors obtained by encoding well-known digital or digitized diagnostic images, whose pixels have been previously associated by an expert to a tissue type, which pixel identifying vectors are uniquely associated to the corresponding known tissue type;

Teaching the expert system by entering the teaching database therein, as well as the modes associated to the processing algorithm type;

Encoding an image or a time sequence of images of the same frame, into pixel identifying vectors according to the method of this invention, which image or sequence is digitally acquired or has been digitized but not interpreted;

Entering pixel encoding vectors for the non interpreted image entered into the processing system, which processes the tissue type or the tissue quality for each pixel identifying vector and displays the result thereof.

Particularly, the result is displayed as color assignments, where predetermined colors are assigned to the different types of object or to the different qualities of the pixels which have been found to belong to an object type and/or quality.

It shall be noted that in this case the method has no diagnostic function, but generates considerably reliable indications for the physician or for the technical personnel responsible for the evaluation of the acquired image. No direct treatment suggestion is provided, but simply an indication of a type of tissue which is highly likely to be found in the image.

The actual and total certainty of the result for final diagnosis requires both the image to be read and interpreted by qualified personnel and other cross-checks to be performed by other diagnostic methods.

Nevertheless, as will be more apparent from the following, it is not easy to read and interpret a diagnostic image, like a radiographic plate, an ultrasound image or a Nuclear Magnetic Resonance image, particularly when the diseases reproduced in the image have a very small extension. The instrument provided by this invention allows to reliably signal potential pathologic elements, while reducing the risk of misinterpretation, or preventing the same elements from being misinterpreted or even from not being seen by the physician or qualified personnel.

Further improvements of the invention will form the subject of the subclaims.

The characteristics of the invention and the advantages derived therefrom will appear more clearly from the following description of a non limiting embodiment, illustrated in the annexed drawings, in which:

FIG. 1 shows the inventive encoding method in a highly simplified manner, in the case of a two-dimensional digital or digitized image, i.e. consisting of a set of pixels (image unit elements).

The example shows a pixel of the pixel set, denoted as 5, which is designed to be encoded in such a manner as to make the information available for any type of treatment, particularly for processing.

Figure 1:
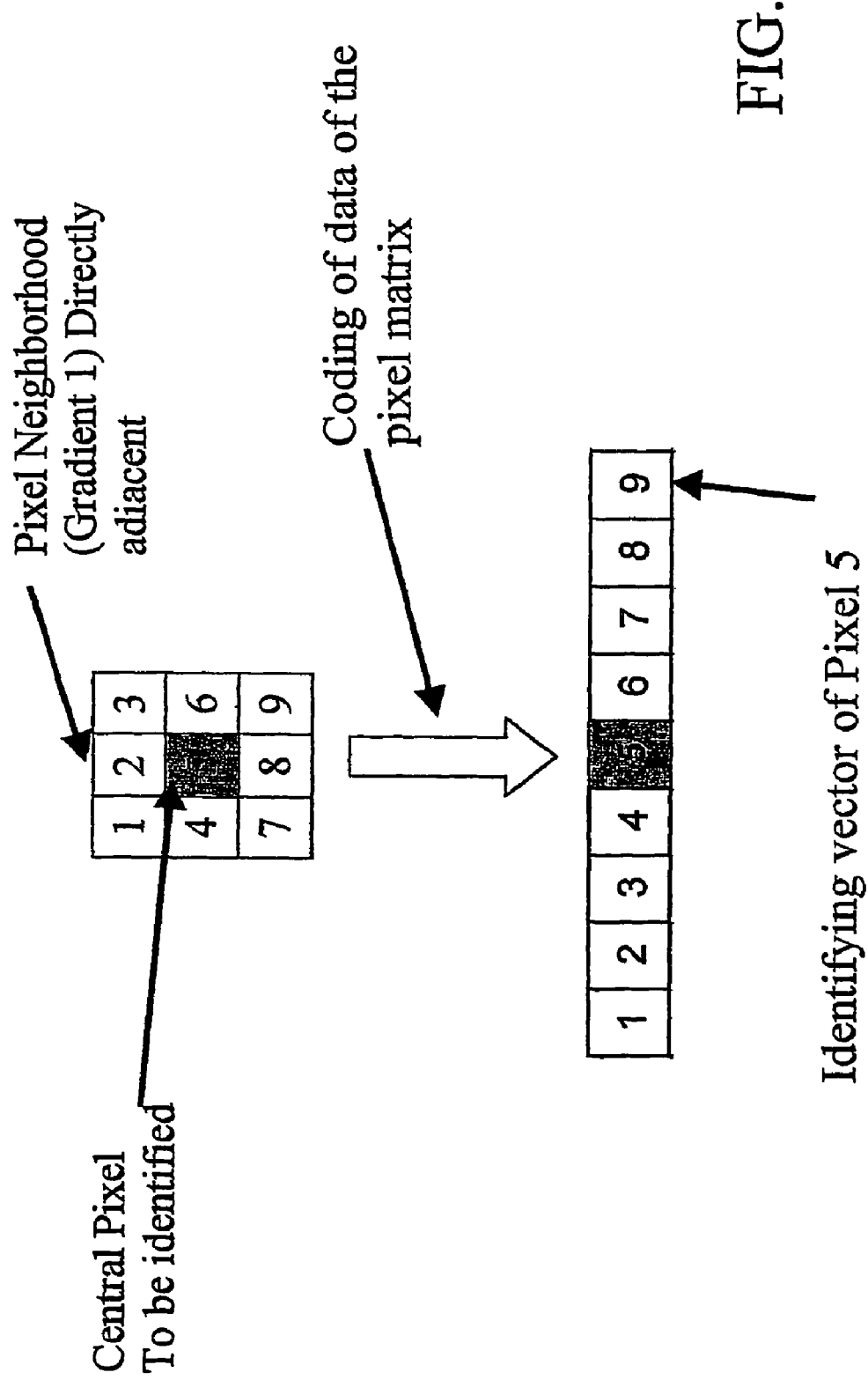
FIG. 1 shows a simplified digital or digitized image pixel encoding scheme according to this invention, in a two-dimensional space.

In this case, the image may comprise any number of pixels and the steps of the method, as shown with reference to the pixel 5 of FIG. 1 are executed for every pixel of the image. In the inventive encoding method, the pixels around the pixel are used to form an identification vector for the pixel 5. The surrounding pixels may be selected according to predetermined rules which may lead to different selections of surrounding pixels, as components of the identification vector, both as regards the number of the surrounding pixels to be selected as components of the identification vector and as regards the location of these surrounding pixels relative to the pixel to be encoded, in this case to the pixel 5.

One of the most obvious selections consists in using, as components of the identification vector for the pixel to be encoded, all the pixels directly adjacent to the pixel to be encoded, that is, in the notation referred to pixel 5 of FIG. 1, the surrounding pixels 1, 2, 3, 4 and 6, 7, 8, 9.

In black and white or gray scale images, the value represented by each pixel is given by a brightness value of the corresponding pixel, i.e. a gray value in a gray scale extending from white to black through a certain number of intermediate levels, which may have a different number of gray tones, depending on the quality of the digital image with respect to the color resolution of the imaging apparatuses.

Depending on the type of color encoding, in color images, each pixel may also have one variable for indicating the color to be assigned thereto.

The example of the following figures will be limited to black and white or gray scale images, to better explain the steps of the method. The extension to pixel color indicating variables is an obvious step for those skilled in the art, which eventually involves the presence of a greater number of components in the identification vector.

FIG. 1 shows the structure of the identification vector for a pixel with reference to pixel 5.

The vector comprises, in the same pixel indexing sequence within the pixel matrix, all the pixels which constitute the vector components, starting from pixel 1 and ending with pixel 9. In this case, the pixel 5 located at the center of the pixel matrix appears to occupy a central place in the sequence of the identification vector components.

The manner in which the pixels designed to form the identification vector for a pixel to be encoded are indexed is not relevant per se; what is important is that the selection of this manner is consistently and accurately followed for all encoding processes, otherwise no comparison between two pixel vectors would be possible, since the vector components would have different arrangement orders.

Therefore, it shall be noted that, for this encoding operation, the identification vector for pixel 5 does not only contain gray-scale brightness, i.e. pixel aspect information about the pixel to be identified, but also brightness information about the pixels around it.

This vector structure is based on the acknowledgement that the content of an image is not recognizable based on the aspect of an individual pixel, but based on the relation between the aspect thereof and the aspect of the surrounding pixels. In practice, each image dot is not important per se, unless it is evaluated with reference to the aspect of the surrounding dots or areas. Even from the visual point of view, what is shown in an image is recognized on the basis of a relative evaluation between the different areas of the image.

As mentioned above, the selection of the surrounding pixels to create the identification vector for the pixel to be encoded is not governed by any specific rule.

For example, it is possible to increase the number of surrounding pixels to be accounted for to generate the identification vectors, by using, as vector components, at least some or all of the pixels of pixel rings surrounding the central pixel to be encoded, at increasing distances from the central pixel to be encoded.

As in the illustrated example, it is possible to account for all or some of the pixels of the pixel ring which externally surrounds the pixel ring directly adjacent to the central pixel 5 i.e. the pixels 1, 2, 3, 4, 6, 7, 8, 9.

In this case, the number of vector components increases drastically, and overloads the identification vector processing conditions. If the identification vector for pixel 5 is arranged to comprise, for instance, all the pixels that externally surround the illustrated 3×3 pixel matrix, the number of identification vector components increases from 9 to 25 components.

In this case, processing might obviously provide a more precise solution.

Furthermore, said additional pixels at a longer distance from the pixel to be encoded may be suitably weighted, possibly also in a different manner from each other, to attenuate the effect thereof on the identification vector.

Figure 2:
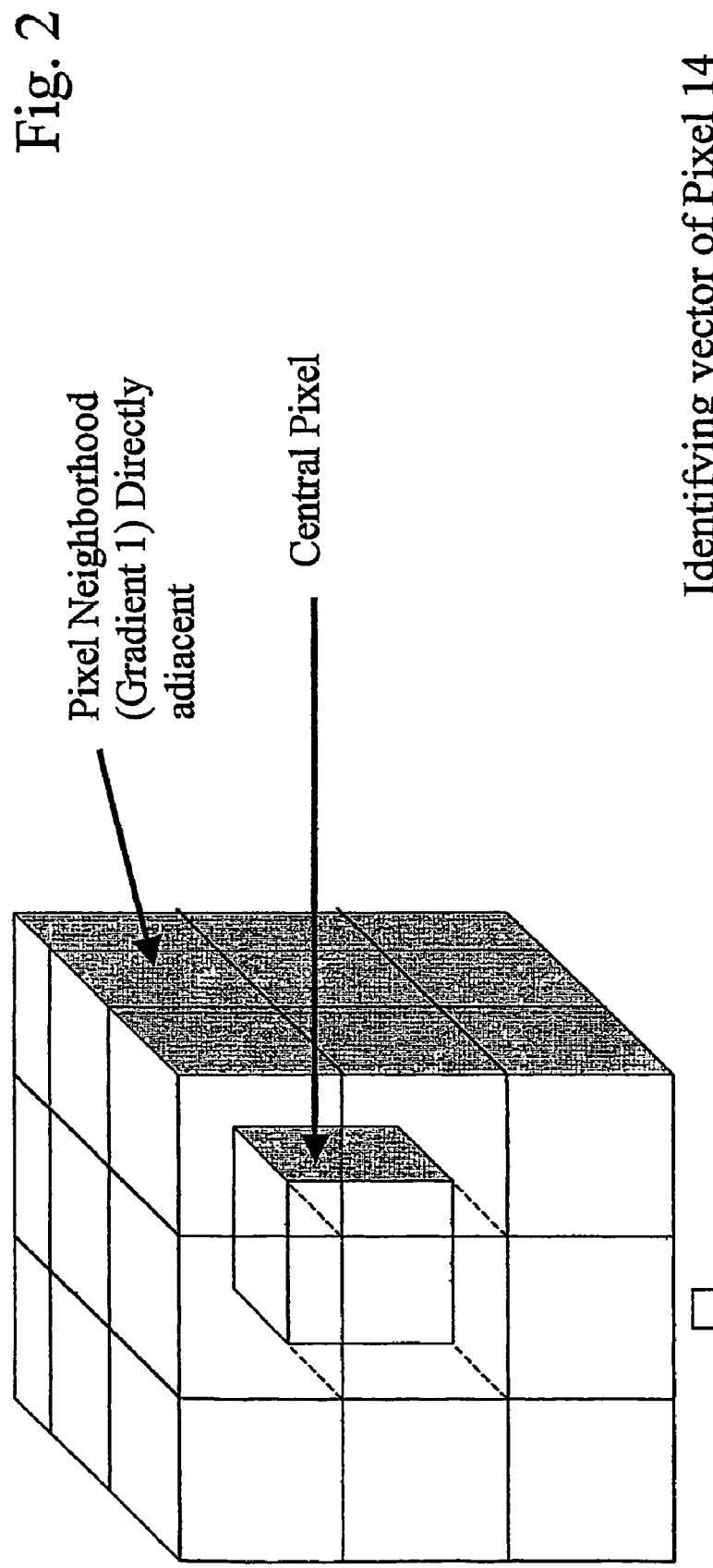
FIG. 2 is a scheme as shown in FIG. 1, referred to a three-dimensional imaging space.

FIG. 2 shows the situation of a three-dimensional image, in which the central pixel 14 is encoded by an identification vector which has, as components, the values of all the pixels directly surrounding it and subtending a 3×3×3 cube, whereby it includes 27 components.

The considerations proposed for the two-dimensional embodiment also apply to the three-dimensional embodiment. This shows more clearly the overloaded processing of the identification vector when other pixels are accounted for, e.g. those of a three-dimensional cubic pixel shell which encloses the illustrated cubic set. In this case, the number of components increases in a cubic progression, from 27 pixels to 125 pixels, if all the pixels of a 5×5×5 cube are considered in the identification vector.

According to an additional characteristic of the invention, the pixel vector encoding method allows to also integrate the behavior through time of the pixel under examination in the identification vector, when a sequence of images of the same frame are available.

The sequence of images may be composed, for instance of frames of a motion picture or of individual images of the same frame as taken at successive instants. An example of imaging of the same frame at successive instants consists in diagnostic ultrasound imaging of contrast agent perfusion. In this case, the perfusion of contrast agents pushed by the flows of vascular circulation is imaged by injecting contrast agents in the anatomic part under examination at the instant Tc, and by subsequently imaging the same part at predetermined time intervals. Time variations of the image allow to check the presence of contrast agents, after a certain period from the injection instant. These images may provide useful deductions and/or information to check the presence of vascular and/or tumor diseases.

In the above case, the recognition of the reproduced object is not only based on the aspect thereof, but also on the time variation of said aspect. Therefore, the pixel vector encoding process aimed at including, in the identification vector for each pixel, all the data characterizing the quality or type of the object reproduced by an image pixel must especially account for the time variation of the encoded pixel.

In this case, the identification vector for a predetermined pixel, e.g. pixel 5, with reference to the embodiment of FIG. 1, contains a set of 9 components, relating to pixels 1 to 9 in the proper time sequence, for each instant whereat the corresponding image has been captured.

The illustrated embodiment show six images of the same frame as acquired at the instants T=0, T=1, T=2, T=3, T=4, T=5. Moreover, the embodiment has been developed with reference to the acquisition of a sequence of ultrasound images of the same anatomic part, performed after the injection of contrast agents. The instant TC whereat contrast agents are injected is denoted by the arrow TC.

The identification vector accounts for pixels 1 to 9 of the three images acquired at the instants T=0, T=1, T=2 and in these conditions the identification vector already has 27 components. When all the 6 images of the time sequence are accounted for, the components will increase to 54. This only relates to an encoding process which accounts for a 9 pixel matrix, in which the pixel to be encoded is the central pixel. When the encoding process is intended to include the pixels surrounding the pixel to be encoded in a 5×5 pixel matrix, i.e. having 25 components of the identification vector for each instant, provided that all the images of the sequence are considered, each identification vector will have 150 components.

Figure 3:
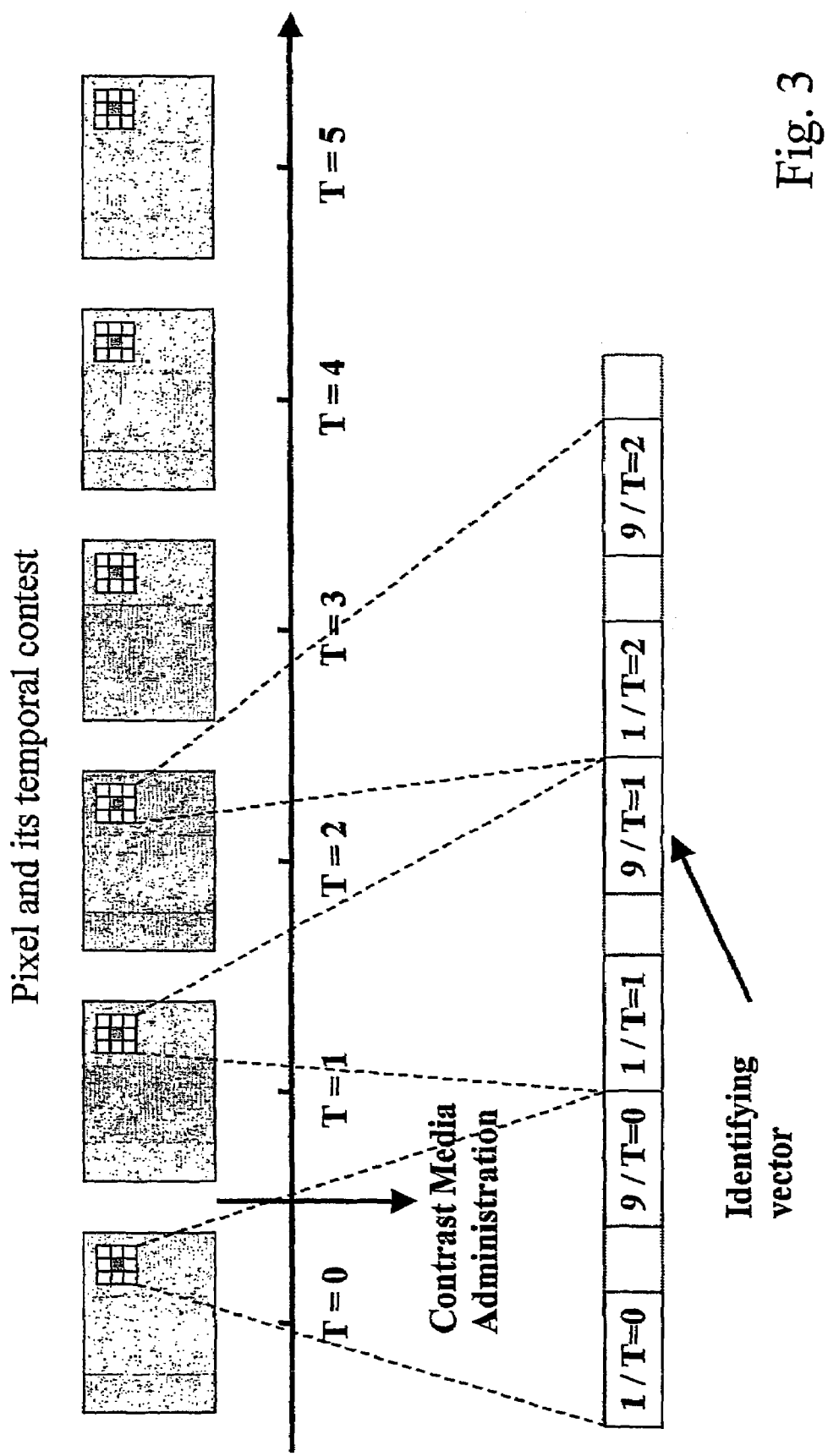
FIG. 3 shows a scheme of the identification vector for the same pixel in a time sequence of digital or digitized images.

In the case of a three-dimensional image as shown in the example of FIG. 2, in which the identification vector for a pixel, with surrounding pixels of a cubic 3×3×3 pixel space, has 27 components, the encoding vector according to the example of FIG. 3 would include, for all six images of the image time sequence, 162 components. If encoding is extended to a 5×5×5 pixel three-dimensional space, the components of the identification vector for the pixel will increase to 750.

It shall be noted that while the inventive encoding method may be followed in a simple and fast manner, it allows to identify the characteristics of an image pixel through its value as well as in relation with its surrounding pixels, and also with reference to time variations of the pixel to be encoded and of the surrounding pixels.

It shall be further noted that this encoding method only accounts for pixels, and of a substantially restricted examination field, which is independent from the subject of the image and of the encoding purpose.

Obviously, encoding times for an image or a sequence of images strictly depend on the image size, in terms of number of pixels.

According to a further embodiment of the present pixel coding method, instead of considering an image formed by single pixels, for coding purposes a minimu image area of different size may be defined which is formed by a more than one adiacent pixel.

Figure 14:
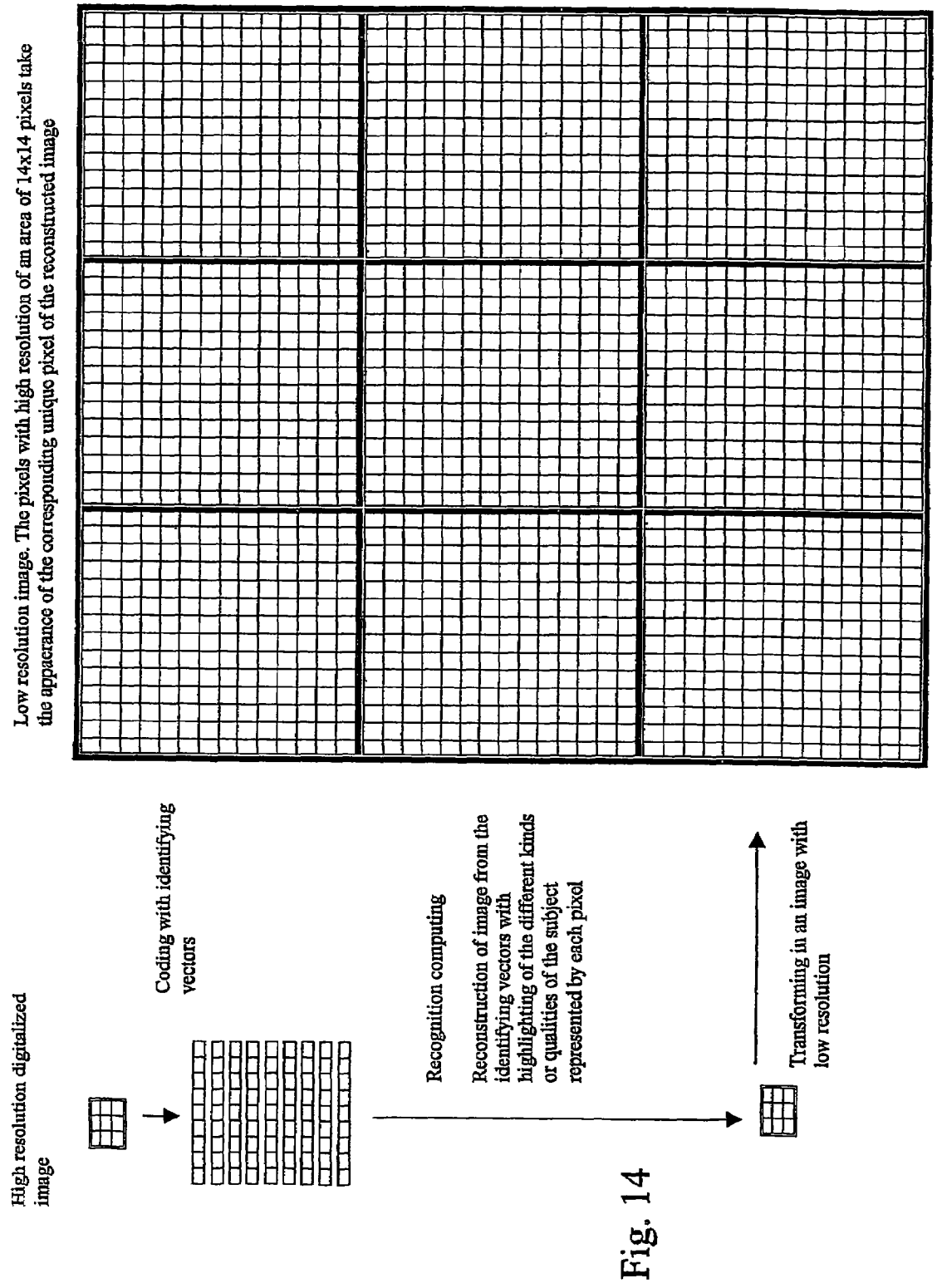
FIG. 14 shows the inventive processing method in combination with steps to display pixels corresponding to a resolution below the human eye and to a resolution level with or worse than that of the human eye.

So referring to the above described method and particularly to FIG. 1 to 3, with 5 in FIG. 1 and 14 in FIG. 2 there is not identified a single pixel but the said minimum image area formed by a certain number of pixels, for example by a matrix of four adiacent piels or of 9 adiacent pixels.

In this case the value of the said minimum image area formed by grouped adiacent pixels may be calculated as a linear or non linear combination and as the value of one or more statistical functions of the of the brightness and or color values of the single pixels grouped together for forming the said minimum image area.

A simple example would consider the mean of the brightness values of the single pixels forming the minimum image area the variance thereof. To this the information relating to the color of the pixels could be add also in the form of a mean and or of a variance value. Furthermore also in this case the time dependency of the values relating to brightness and/or color could be add similarly as disclosed above relating to FIG. 3. In this case the time dependency of the combination and of the statisitical function of the brightness and or color values of the single pixels will be considered, i.e. the variation relatively to time of the mean value of the brightness or color values of the single pixels forming the minimu image area and or the variation relatively to time of the value of the statistical fuction.

As selected neighborhood pixels for the pixel vector identifying the said minimum image area, there might be the choice between to alternatives.

In one alternative the selected piels of the neighborhood are considered per se.

In the second alternative also the neighborhood pixels are grouped together for forming selected minimum image neighborhood areas. To explain more clealrly the idea, if FIG. 1 or 2 are considered the image area indicated as pixel 1 to 4 and pixel 6 to 9 in the example of FIG. 1 are not single pixels as described in the previous example but are formed by a certain number of adiacent pixels. This certain number of pixels might be the saome as for defining the minimu image area to be coded or it might be a different number of pixels as the one grouped for forming the minimum image area to be coded.

The advantage of such a oding method condidering minimu image area comprising more than ome pixel will speed up the coding computational time and is useful and will give not rise to errors particulallry in the case the subject being imaged does not show any structural change within an area of several pixels, or the image resolution is o low that no structural variation can be sensed and shown within the area for two or more adiacent pixels forming the image.

In the strictly diagnostic field, for instance, in which, due to practical and economic reasons, the number of image pixels is generally limited to 256×256 pixels for a two-dimensional image, encoding is extremely fast. In this cases a coding according to the method as disclosed with reference to FIGS. 1 to 3 may be used without suffering by a too high duration of the coding procedure.

The encoding method as disclosed above, which includes the information about the aspect of a pixel with reference to the surrounding pixels and/or the time variations thereof, allows image processing methods which substantially require a recognition of the object type or of the quality of what is reproduced by the pixel, and allow to automatically recognize the type of object and/or the quality thereof by the same processing system or software.

Figure 4:
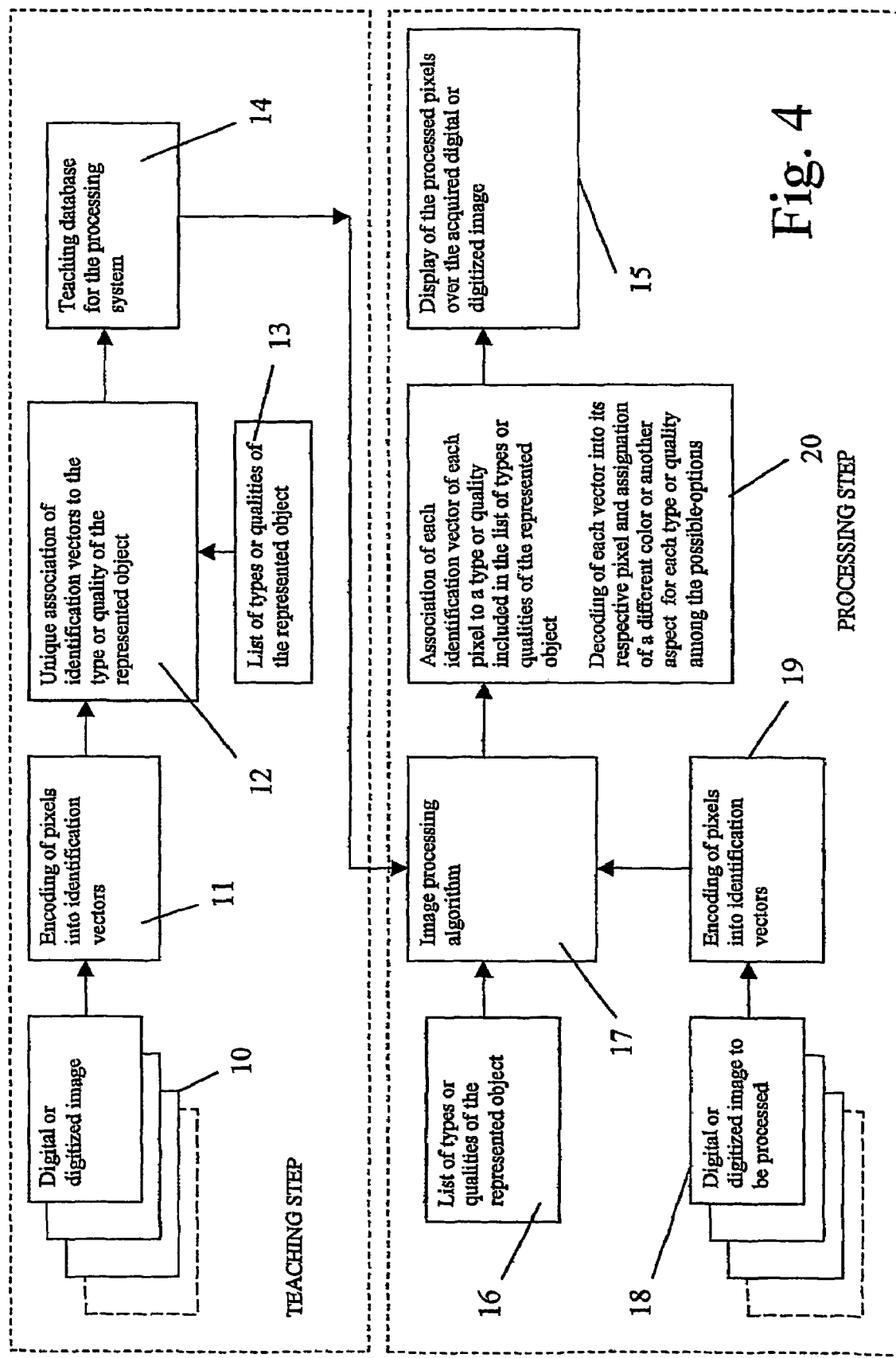
FIG. 4 shows a block diagram of the inventive image processing method, which operates based on the pixel encoding method as shown in the previous figures.

FIG. 4 is a block diagram of a method of processing digital or digitized images, operating on the basis of the previously described encoding method.

The processing method includes two steps: teaching the processing system and processing.

Processing is performed, per se, by an algorithm which is basically an algorithm for executing comparisons between a database that includes a certain number of identification vectors for pixels associated to the type of object or to the quality corresponding thereto and the identification vectors for pixels of an image to be processed.

As a result of the comparison between the identification vector for each pixel of the image to be processed and the identification vectors for the pixels included in the database, the comparison algorithm assigns to each pixel encoding vector within the image to be processed, or to a predetermined portion thereof, the most appropriate or probable or the closest type of object or quality of the pixel identifying vector included in the database.

The processing algorithm may be a simple discriminating algorithm, for instance an LDA algorithm (Linear Discriminant) (S. R. Searle, 1987, Linear Models for unbalanced data, New York, John Wiley & Sons) or a more complex algorithm, e.g. neural networks. The image processing procedure to be used is a typical application for neural networks, i.e. an application in which a very great number of typically simple operations is required, and which finds no exact numerical solution due to the considerable number of identical processing steps to be performed. In practice, a dull execution of the steps for comparing identification vectors for the image pixels to be processed, with the identification vectors for the pixels of the reference database, would require so lung computing times as to be unacceptable.

A number of neural networks might be used, for instance those known as: MetaGen1, MetaGen, MetanetAf, MetaBayes, MetanetBp, MetanetCm (M. Buscema (ed), 1998, SUM Special Issue on ANNs and Complex Social Systems, Volume 2, New York, Dekker, pp 439-461 and M. Buscema and Semeion Group, 1999, Artificial Neural Networks and Complex Social Systems [in italian], Volume 1, Rome, Franco Angeli, pp 394-413 and M. Buscema, 2001, Shell to program Feed Forward and Recurrent Neural Networks and Artificial Organisms, Rome, Semeion Software n.12, ver 5.0), TasmSABp, TasmSASn (M. Buscema and Semeion Group, 1999, Artificial Neural Networks and Complex Social Systems [in Italian], Volume 1, Rome, Franco Angeli, pp. 440-464), FF-Bm, FF-Bp, FF-Cm, FF-Sn et al. (D. E. Rumelhart, G. E. Hinton, and R. J. Williams, 1986, Learning representations by back-propagating errors, Nature, 23: 533-536; M. Buscema, 2000, Squashing Theory and Contractive Map Network, Rome, Semeion Technical Paper n. 23i-23e; M. Buscema, 1995, Self-Reflexive Networks. Theory, Topology, Applications, in Quality & Quantity, Kluwer Academic Publishers, Dordtrecht, The Netherlands, vol. 29(4), 339-403, November). The publications describing the above neural networks shall be considered as a part of this invention.

The teaching step consists in generating a database of pixel identification vectors which are uniquely associated to the type of object or quality reproduced by pixels of digital or digitized images which are encoded as described above, and are interpreted on the basis of visual operations performed by qualified personnel. The identification vector of each pixel is associated to the type of object or quality of what is reproduced by the pixel, a list of object types or qualities of interest having been previously defined, consistent with the typical subjects of the digital or digitized images used for teaching, hence for generating the knowledge database to be provided to the processing algorithm.

The knowledge database for teaching the processing algorithm is provided or allowed to be accessed by the processing algorithm, depending on the specific teaching mode of the selected processing algorithm.

At the end of the step for teaching the processing algorithm, a digital or digitized image of an image subject is encoded with the above described method, in a manner compatible with those used in the images designed to form the knowledge database and a list of object types or qualities is defined, among those included in the knowledge database of the processing algorithm. The processing algorithm substantially compares the identification vectors of the individual pixels generated by the encoding process, and assigns the most probable object type or quality of the reproduced object, to each pixel.

The different indications of object types or qualities associated to each identification vector for image pixels are then displayed by printing lists and/or by differentially highlighting, e.g. by colors, the pixels of the image to be processed directly on the image.

Depending on the total number of pixels and on the accuracy required by the list of object types or qualities reproduced in the individual pixels, either subsets of types or qualities or all the types and/or qualities may be selected.

The digitized or digital images may be two-dimensional or three-dimensional with reference to what has been described for the encoding method, or may consist each of a sequence of images of the same frame, as acquired at different instants.

In greater detail, FIG. 4 shows the two teaching and processing steps in which 10 denotes a set of digital or digitized images, both individually and in the form of image sequences. 11 denotes the procedure of encoding each pixel of said images into the corresponding identification vector. 12 denotes the step of uniquely associating the object quality or type as reproduced by each pixel to the corresponding identification vector based on the list of predetermined object types or qualities 13 and 14 denotes the reference or teaching database for the image processing algorithm.

In the processing step, a digital or digitized image or a set of said images, such as a sequence of images of the same frame, denoted as 18, is subjected to a step of pixel encoding into identification vectors, denoted as 19, and the identification vectors are provided to the processing algorithm 17, which is also supplied with a list of types or qualities specifically sought for and included in the list 13 wherewith the teaching database 14 was prepared to be accessed by the processing algorithm 17. The processing algorithm assigns to each identification vector for the pixels of the image/s 18 an object type or a quality and the identification vectors are decoded in 20 into the corresponding pixel, the latter being assigned any pixel aspect changes uniquely related to the type associated thereto, for instance a color or the like. The pixels marked thereby are displayed on the screen, e.g. over the original image/s and/or a list of the identification vectors for the pixels of the digital image/s to processed is printed, and/or the image displayed on the screen is printed.

As an alternative thereto, the data provided from the algorithm may be used for further processing, based on the recognition of the object qualities or types reproduced by the individual pixels thanks to the processing algorithm.

Any further processing or handling of the data provided by the algorithm may be performed by the algorithm itself or by other types of algorithms, depending on the desired functions or handling purposes.

Hence, for example, the above processing method may be used to simply recognize objects, or qualities or conditions or statuses of the objects reproduced by pixels.

This type of processing is advantageously used in the medical field, as an automatic support to reading and interpretation of diagnostic images, particularly radiographic images, ultrasound images, Nuclear Magnetic Resonance images, or the like.

As an alternative thereto or in combination therewith, the method of the invention may be used to recognize shapes or types of objects in images with the same subject and substantially the same frames, but being shot or acquired with different methods. In this case, each of the images of the same subject and showing substantially the same frame may be processed with the processing method of the invention, whereupon the pixels of the different images, having substantially identical positions therein and being associated to the same object type or object quality are shown in overlaid positions, thereby providing an image which contains the details of the same subject, as imaged with the three methods. This may be advantageous to integrate into a single image, details that may only be recognized and reproduced with some of the acquisition or imaging techniques or modes, as well as details that may be only recognized and imaged with other acquisition or imaging techniques.

Similarly, the processing method may be used for image correction, e.g. to accurately correct defocused images. Here, by providing an adequate teaching database including the identification vectors of defocused images with a uniquely associated object type or quality reproduced by the corresponding pixel, the inventive method may be used to generate a focused image, by identifying the pixels which reproduce unfocused borders and removing or modifying them to obtain the focused image.

The two applications as described above may be obviously used in the medical field.

Particularly, by using the processing method to obtain overlaid images substantially of the same frame of the same subject, all data obtained by different imaging techniques, e.g. ultrasound, radiographic and MR imaging may be integrated into a single image.

It shall be noted that the possibility to recognize the different types or qualities of an object allows to integrate the information achieved by different imaging techniques even when the latter provides images of different frames of the same subject, while obviously accounting for the relative arrangement of said different frames in space.

FIGS. 5 to 13 show the results of an embodiment of the inventive method as applied to the medical field and to the purpose of supporting the diagnostic activity of the physician.

Particularly, the example as shown in FIGS. 5 to 13 relates to the use of the processing method for selective recognition of different types of tissues in diagnostic Nuclear Magnetic Resonance images.

EXAMPLE 1

FIG. 5

| | |
|---|---|
| SUBJECT | BREAST |
| IMAGING METHOD | NUCLEAR MAGNETIC RESONANCE |
| PURPOSE | RECOGNITION OF TISSUE TYPES |
| TISSUE TYPES | 1. BENIGN TUMOR |
| | 2. MALIGNANT TUMOR |
| PIXEL ENCODING | 3 × 3 PIXEL MATRIXES |
| | THE ENCODED PIXEL IS THE |
| | CENTRAL PIXEL |
| IMAGE DEFINITION | 256 × 256 PIXEL |

In the example 1, a teaching database for the image processing algorithm is generated to recognize two types of tissues, i.e. benign tumor and malignant tumor in the breast region.

A predetermined number of Nuclear Magnetic Resonance images of the breast region of patients who have been diagnosed a malignant breast tumor and of patients who have been diagnosed a benign breast tumor are pixel encoded according to the method described above. The identification vectors for the pixels have, as components, all the surrounding pixels in a 3×3 pixel matrix, in which the pixel to be encoded is the central pixel (FIG. 1).

The identification vector for each pixel is assigned the type of tissue reproduced by the pixel in the image.

Therefore, the teaching database for the image processing algorithm contains identification vectors of image pixels relating to two tissue types, i.e. malignant tumor tissues of the breast region and benign tumor tissues of the breast region.

The following algorithms composed of so-called neural networks are used as processing algorithms.

| PROCESSING ALGORITHM |
| --- |
| MetaGen1 |
| MetaGen |
| MetanetAf |
| FF-Bm |
| MetaBayes |
| MetanetBp |
| MetanetCm |
| FF-Sn |
| TasmSABp |
| TasmSASn |
| FF-BP |
| FF-Cm |

Figure 8:
FIG. 8 shows a first Nuclear Magnetic Resonance image, in which the presence of a benign tumor tissue is outlined by a white ring.

A sequence of Nuclear Magnetic Resonance images of the breast region of different patients, which were not used for generating the teaching database are encoded as disclosed above with reference to FIG. 1, and according to the pixel encoding method which is followed to encode the images used to create the teaching database for the processing algorithms. An example of these images is shown in FIG. 8. The white ring denotes the presence of benign tumor tissue.

The identification vectors for the individual pixels are provided to the processing algorithm for the recognition of the tissue type reproduced thereby.

The algorithm assigns to the different identification vectors, hence to the corresponding pixels, the type of tissue represented thereby based on the teaching database.

The result thereof is displayed by appropriately and differentially coloring the pixels whereto the type of benign or malignant tumor tissue has been assigned.

Figure 9:
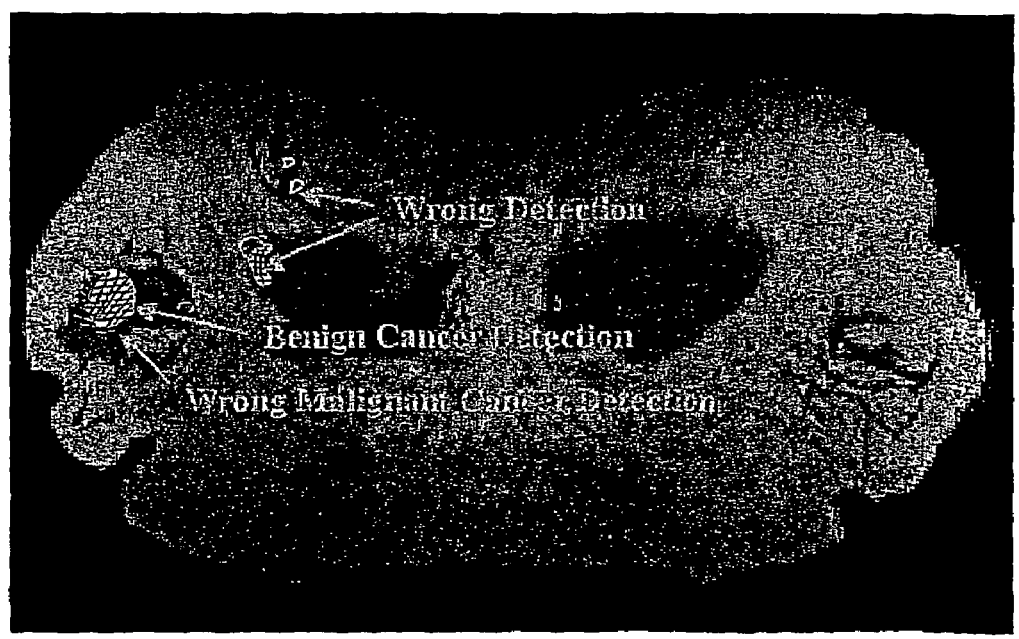
FIG. 9 shows the same image as FIG. 8, but processed with the method of the invention and with the mode in which only benign tumor tissues are recognized, in which the system has displayed the result on the originally acquired image by assigning a different aspect to the pixels which have been found to belong to the one or the other tumor tissue.

FIG. 9 shows a tissue type recognition result example referred to the image of FIG. 8, in which the white outlined area had been recognized by visual analysis as representing the benign tumor tissue.

In FIG. 9, the black screened white zone represents the pixels whereto the processing algorithms assigned the type of benign tumor tissue.

The white encircled black zones denote the pixels whereto the processing algorithms assigned the type of malignant tumor tissue.

As compared with the recognition of malignant or benign tumor tissue types, obtained through visual analysis by a physician, for some pixels the algorithm provided non accordant indications, which have been temporarily classed as wrong.

Figure 5:
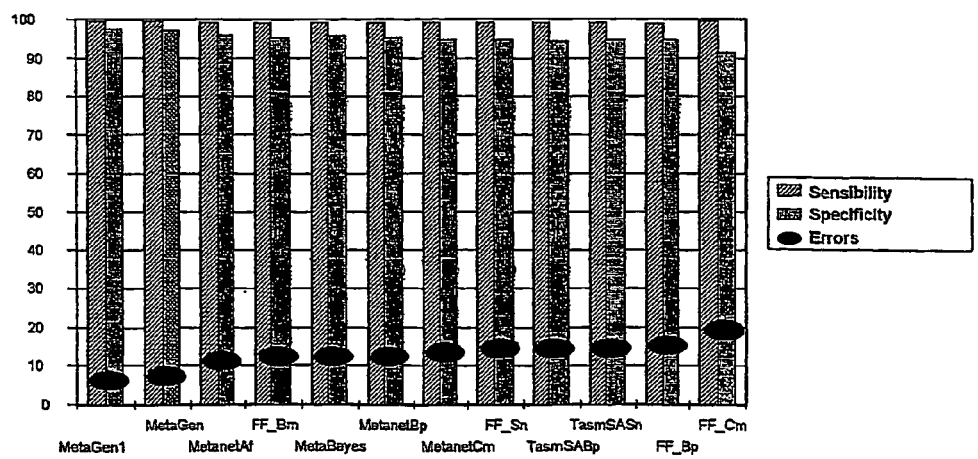
FIG. 5 shows a data table and a chart of the image processing results for the image as shown in FIG. 8 or in FIG. 11, obtained by Nuclear Magnetic Resonance imaging, and in which the processing system was operated with a teaching base only comprising two types of tissues, i.e. benign tumor tissues and malignant tumor tissues.

FIG. 5 shows both in a data table and in a chart the prediction reliability results of tissue type recognition obtained by processing with the different neural networks as listed above. The results obtained therefrom are expressed in terms of correct benign or malignant tumor tissue recognition percentage, of recognition sensitivity and of weighted and arithmetic correct recognition average, as well as absolute errors. The chart only shows the two tissue type recognition percentages and the errors.

The above description clearly shows the high tissue recognition reliability obtained by the processing algorithm, hence the high reliability provided by the processing method, when used as a diagnostic image analysis method, for recognizing and indicating the presence of types of tissues.

It is apparent that this method is not a pure diagnostic method, because, although the indications provided thereby are highly reliable, they can provide no diagnostic certainty nor substitute or prevent the execution of additional specific analyses or examinations needed for a totally reliable diagnosis.

The method substantially provides support to diagnostic image reading and interpretation, aimed at better location and recognition of specific tissue types represented in the images. The difficulties in reading and interpreting diagnostic images, whether of the MRI and ultrasound or radiographic imaging types are self-evident from FIG. 8.

Obviously, a better result may be achieved by changing the encoding rule, i.e. by increasing the number of surrounding pixels around the pixel to be encoded, which are designed to form the components of the identification vector of said pixel to be encoded.

Better results were also achieved by increasing the number of the tissue types contained in the teaching database, as shown in the following examples.

EXAMPLE 2

The example 2 is similar to the example 1, an additional tissue type, i.e. normal tissue, being included in the recognition database. Hence, when the teaching database is generated, the encoded vectors for the pixels of the images are uniquely associated to one of the tissue types represented thereby, i.e. benign tumor tissue, malignant tumor tissue or normal tissue.

This additional type allows to count on a greater number of pixels and corresponding identification vectors having a sure meaning. In the previous example, these pixel identifying vectors and the corresponding pixels have no meaning for the processing algorithm, whereas in this second example, the processing algorithm can assign an additional well-defined class or type of tissue.

This additional possibility provides an error reduction, since the algorithm may choose from three conditions or statuses to be assigned to the identification vectors.

The execution of the example is exactly as described and shown with reference to the previous example 1.

In this example, only the following neural networks were selected as processing algorithms:

| PROCESSING ALGORITHM |
| --- |
| MetaGen1 |
| MetaGen |
| MetanetAf |
| MetaBayes |
| MetanetBp |
| MetanetCm |
| FF-Sn |
| FF-BP |
| FF-Cm |

Figure 6:
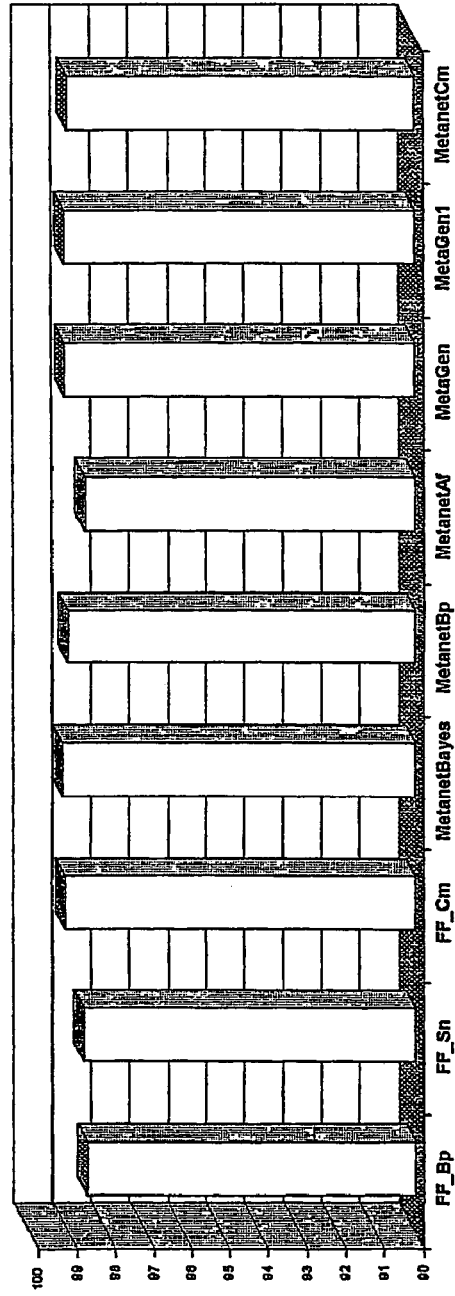
FIG. 6 shows a data table, and a corresponding chart of the image processing results for a Nuclear Magnetic Resonance image, as seen in FIG. 8 or in FIG. 11, in which the processing system used a teaching base comprising three types of tissues, i.e. benign tumor tissue, malignant tumor tissue and normal tissue.

The numerical results are listed in FIG. 6.

The recognition of tissue types by the different neural networks is more reliable.

EXAMPLE 3

The example 3 is similar to the above examples, but includes five tissue types, i.e.: benign tumor tissue, malignant tumor tissue, normal tissue, muscular tissue and image background.

The teaching database is generated as described above with reference to the previous examples and includes pixel identifying vectors, each being uniquely assigned one of the above five types, i.e. the one represented by the respective pixel.

Figure 7:
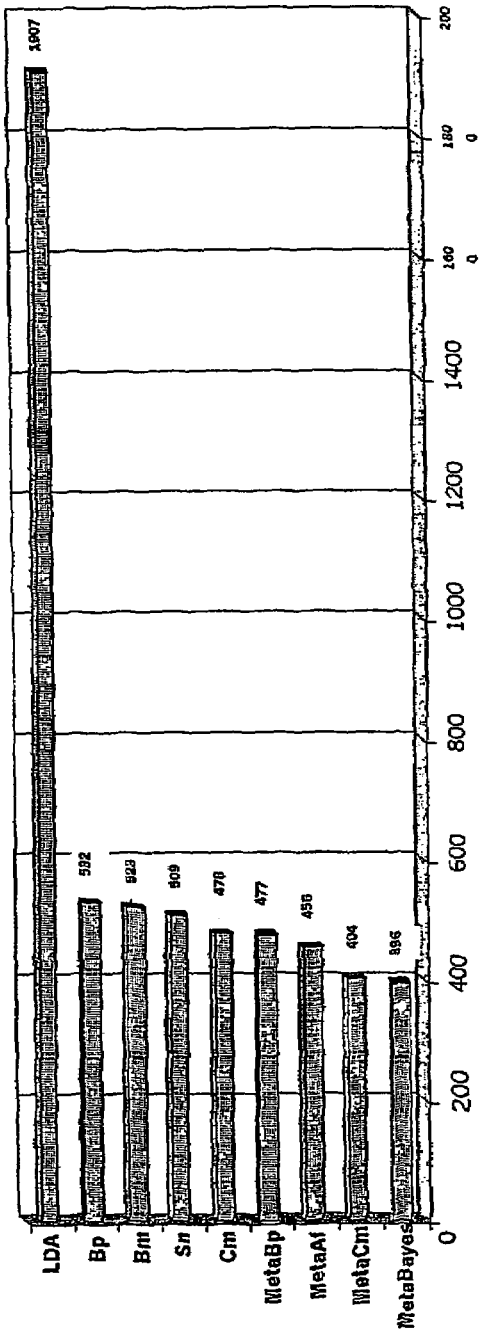
FIG. 7 shows a data table and a corresponding chart of the image processing results for a Nuclear Magnetic Resonance image, as seen in FIG. 8 or in FIG. 9, in which the processing system operated with a teaching base comprising four types of tissues and an additional object type, i.e. benign tumor tissue, malignant tumor tissue, normal tissue, muscular tissue and background image.

The tissue type recognition result per image pixel is shown in FIG. 7 and for the following algorithms:

| PROCESSING ALGORITHM |
| --- |
| MetanetAf |
| MetaBayes |
| MetanetBp |
| MetanetCm |
| FF-Bm |
| FF-Sn |
| FF-Bp |
| FF-Cm |
| LDA |

All these processing algorithms, except LDA, are neural networks. LDA is a discriminating algorithm.

The result achieved thereby proves a very high tissue type recognition reliability. It shall be further noted that the discriminating algorithm also provides unexpected results in relation to the capabilities thereof, when compared with normal conditions, although the results provided thereby are definitely lower than those obtained by neural networks.

The chart shows the errors for each different algorithm.

Figure 10:
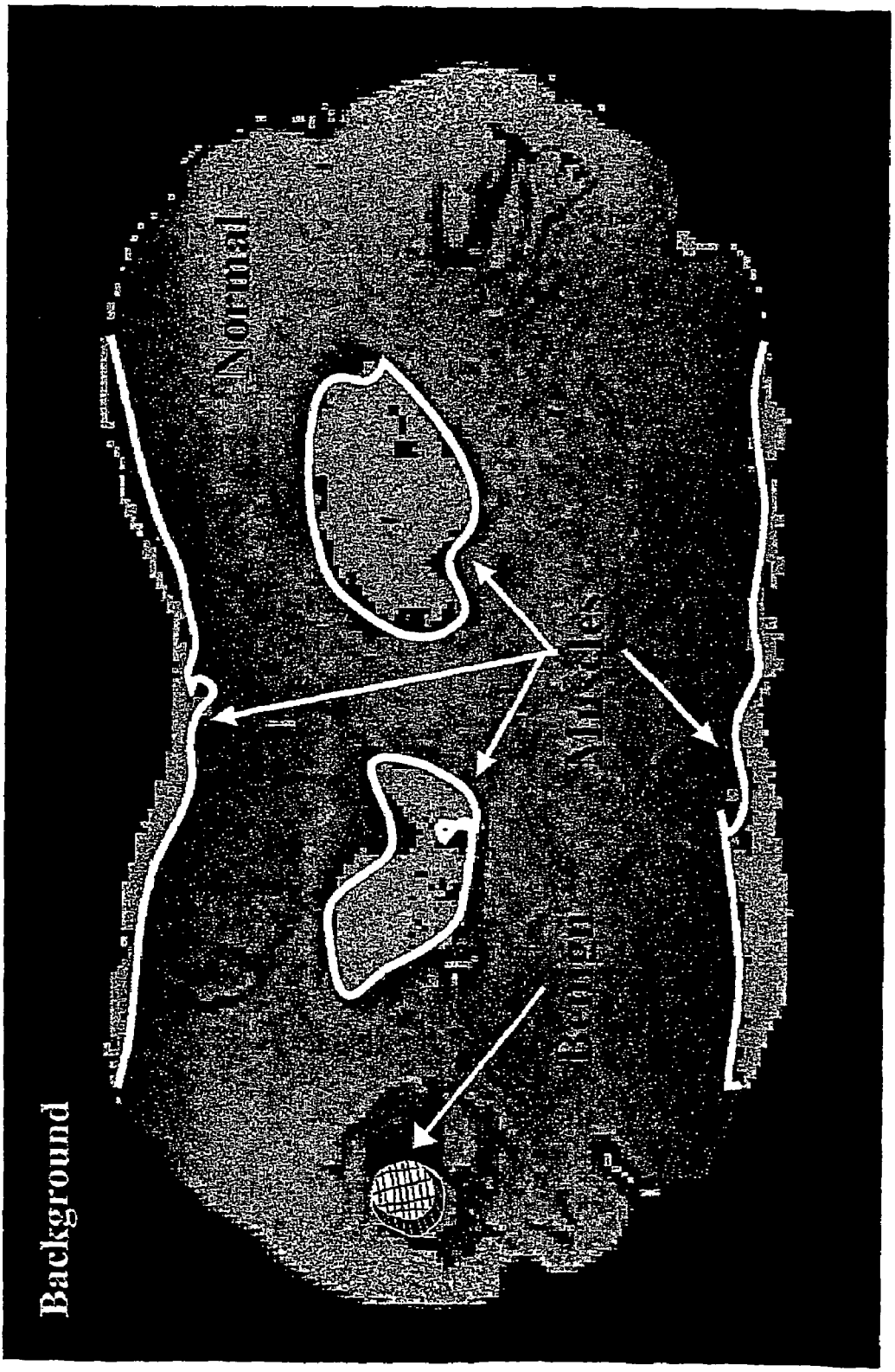
FIG. 10 shows the same image as FIGS. 8 and 9 once it has been processed according to this invention, the system having been taught to recognize the four types of tissues and the background, and the system having been prompted to display the originally acquired image by assigning different aspects to the pixels which have been found to belong to the different tissue types and/or to the background.

FIG. 10 shows an example of result visualization by differentiated pixel coloring, depending on the different types recognized therefor, and with reference to the example of FIG. 8.

The muscular tissue, the background, the normal tissue and the benign tumor tissue are properly recognized. The indications detected in FIG. 9, regarding the example 1, in which in some small portions benign tumor tissue was wrongly located, have disappeared herein.

Figure 11:
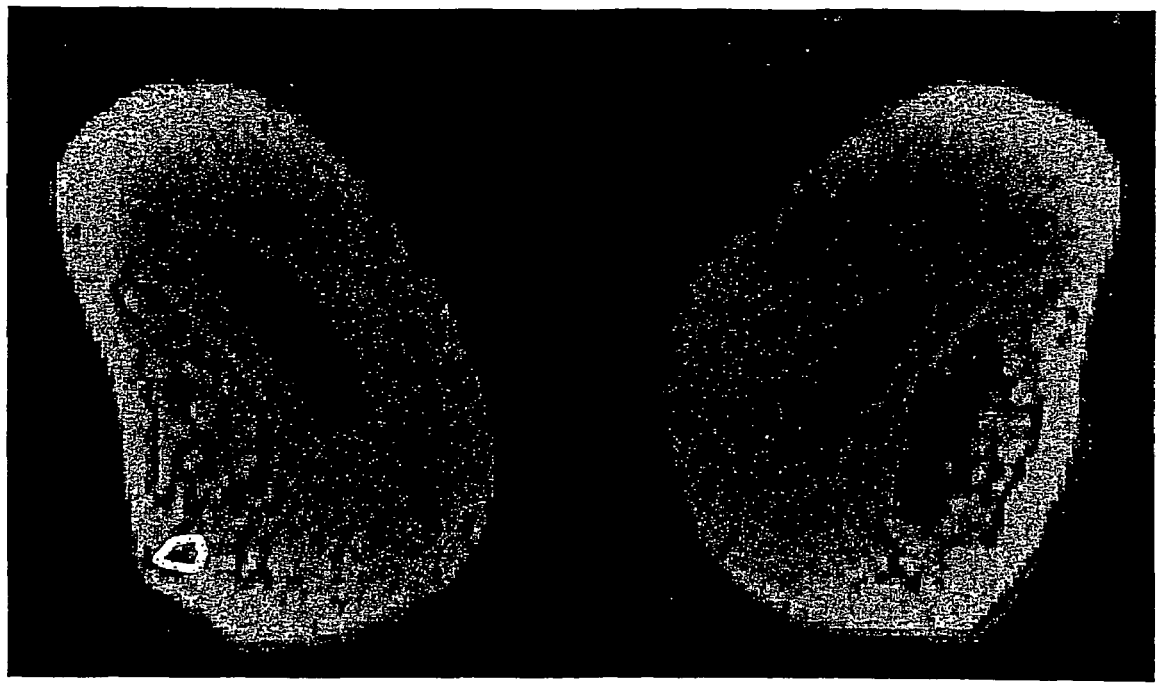
FIGS. 11 and 12 are another Nuclear Magnetic Resonance image containing a malignant tumor tissue, as outlined by the white ring, and an enlarged image of said region containing the tumor tissue respectively.
Figure 12:
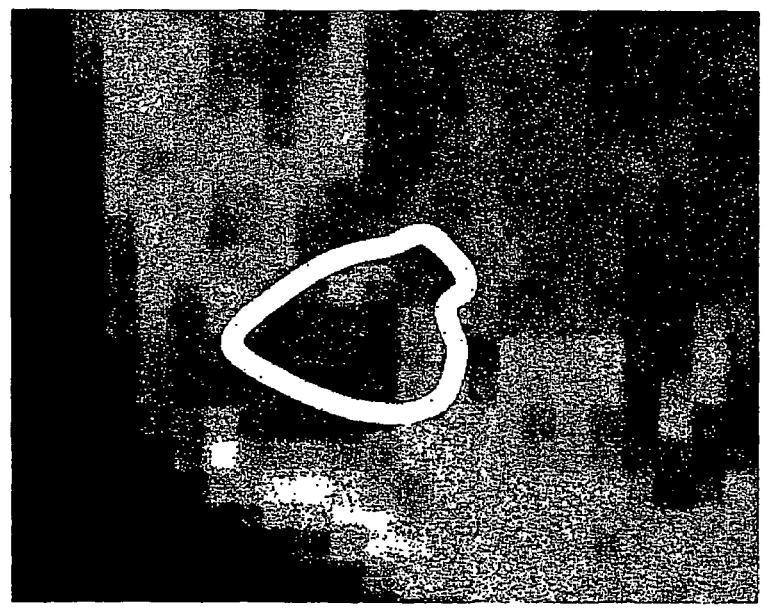
Figure 13:
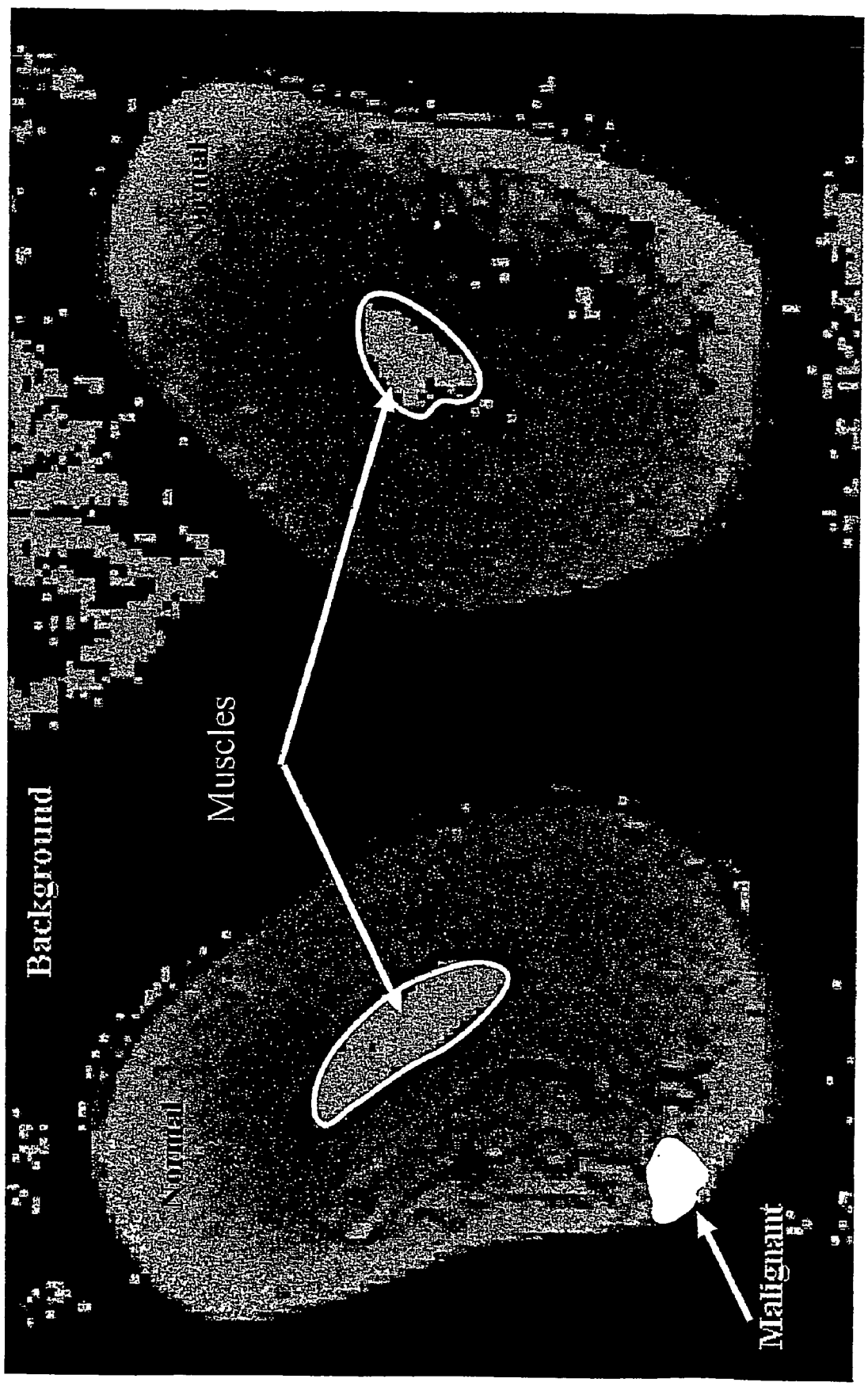
FIG. 13 is the same image as FIG. 11, representing the result of image processing according to this invention, operated for recognition and differentiated display, on the same acquired image, of five different object types, including four tissue types (benign tumor, malignant tumor, normal and muscular) and a background type.

FIGS. 11, 12 and 13 show an example of Nuclear Magnetic Resonance digital photographs of a breast region including a malignant tumor tissue, as highlighted by a white ring in FIG. 11 and by a corresponding partial enlarged view in FIG. 11.

FIG. 13 shows the result obtained in terms of recognition of the tissue types reproduced by the image pixels, thanks to the method of the invention, with the help of a neural network as a processing algorithm. The teaching database is the same as in the example 3, including all five tissue types.

Correct recognition of malignant tumor, background, and muscular tissue is apparent from FIG. 13, which shows an example of recognition processing result visualization.

As regards the described examples and the processing method of the invention, it shall be noted that, while identical frames are always used in the figures of the examples, the described method is not necessarily limited to the type of frame. Thanks to the fact that the encoding method according to the invention allows to account for the relation between the encoded pixel and the surrounding pixels, the teaching database actually allows to identify and recognize the tissue type reproduced by a pixel of a digital image of the same anatomic region or possibly of different anatomic regions, regardless of the specific image frame.

This considerably simplifies imaging, as it does not require images to be always acquired with the same frame.

It shall be further noted that the teaching database may dynamically grow by the addition of data gathered and confirmed through successive processing procedures. In fact, once the tissue type assignment by the algorithm to a predetermined pixel and to the corresponding identification vector has been confirmed, the identification vector-tissue type pairs so formed may be themselves loaded in the teaching database which grows with the use of the method, thereby making the processing algorithm increasingly expert and reducing the indecision or error margin.

It shall be additionally noted that, by simply adding a tissue type to be recognized and assigning it to pixel identification vectors of images used to generate the teaching database, and which reproduce said tissue type, the recognition processing may be changed as regards the number of different tissue types to be recognized.

By totally changing the teaching database, it is possible to recognize other tissue types in other types of subjects, and to correct or overlay images of the same subject, obtained with different techniques.

Image processing aimed at recognizing tissue types or qualities is also possible by a pixel vector encoding method, which accounts for time variations of the pixel reproducing a specific object, i.e. the type according to the encoding example of FIG. 3. As disclosed above, this encoding type allows to encode pixels of image sequences.

In the diagnostic field, a tissue recognition method may be provided for moving subjects, such as in the case of ultrasound imaging or similar, of the heart.

Currently, upon the control of the electrocardiogram, sequences of ultrasound images of the heart region are acquired, to be further stored and displayed successively like in a movie sequence. The interpretation of the images within the sequence, especially with reference to specific diseases is not easy and is relatively uncertain. Hence, thanks to the processing method as described with reference to the examples 1, 2 and 3, as combined with a method of encoding image pixels of image sequences of the same type as described with reference to FIG. 3, an automated analysis and recognition of the tissue types reproduced by the individual pixels of the image sequence may be performed, whereupon said types may be highlighted in a differentiated manner, over the sequence images, to improve the viewing and locating potential of the physician or the qualified personnel.

A similar application field for a combination of the processing method for tissue type recognition in digital or digitized image sequences with a pixel encoding method for the pixels of said sequence images, respectively by an identification vector including, for each pixel, the values of the pixel to be encoded and of the pixels around it, of each image of the image sequence, consists in the recognition of tissues or vascular or lymphatic flows in combination or not with the injection of contrast agents, as well as in the recognition and measurement of contrast agent perfusion.

In this case, the sequence of images acquired with time after the injection of contrast agents is encoded with the method as described with reference to FIG. 3. The teaching database for the processing algorithm includes behavior types, e.g. arterial blood flow or lymphatic or venous flow and stationary tissues and/or tissues of vessel walls. Then, the recognition results are displayed e.g. by appropriately coloring the pixels relating to the different types.

In all the above cases, it is important to generate an adequate teaching database containing the relevant object types or qualities for the specific examination.

It shall be noted that the same processing unit, i.e. the hardware wherein the processing software is loaded, may perform any of the above recognition processing procedures, by simply providing the processing software with the proper teaching database for the images to be processed and by obviously encoding the images to be processed.

Regarding image correction procedures, i.e. image processing aimed at suppressing or recognizing artifacts and/or at recognizing defocused areas and at correcting them by focusing the image, the processing method of the invention does not substantially change.

As regards artifacts, a teaching database shall be generated in which known images with or without artifacts are encoded, by assigning the artifact type to artifact-reproducing pixels and the correct pixel type to correct object reproducing pixels. Once an image or a sequence of images has been recognized, it may be easily corrected by suppressing artifact-related pixels or by assigning to artifact-related pixels the tissue types or qualities which they might have with reference, for example, to surrounding pixels.

Defocusing may be corrected in a similar manner.

The processing method of the invention may be also advantageously used to generate images composed of individual images of the same subject as obtained by different techniques, e.g. Nuclear Magnetic Resonance imaging, ultrasound imaging and x-ray imaging.

In this case, the teaching database will contain pixel encoding vectors for all three images obtained with the three different techniques, with tissue types or qualities corresponding to said pixels being uniquely associated to said vectors. Hence, image portions are uniquely associated to specific tissue types and said well-defined portions may be displayed in overlaid positions or other combined arrangements within a single image.

An additional application of the inventive recognition method, in combination with imaging methods, particularly for diagnostic purposes, such as ultrasound or Nuclear Magnetic Resonance imaging methods, consists in that imaging is performed with less accurate but considerably faster imaging sequences or techniques and that the displayed image is an image processed with the recognition method of this invention.

This allows to maintain high reliability levels in the recognition of the types or qualities reproduced by the individual image pixels and to shorten the diagnostic imaging times. This arrangement may be very useful particularly for ultrasound or Nuclear Magnetic Resonance imaging, which require relatively long imaging times, in certain situations, and provides apparent advantages.

The processing method of the invention also provides considerable advantages in the recognition of tissue types, like potentially diseased tissues, for example tumor tissues at very early stages. Currently, x-ray mammography, for example, is performed with spatial resolutions of about 7 micron. Therefore, these images or the data associated thereto have such a resolution that different tissue types may be discriminated at very early growth levels, in groups of a few cells. Nevertheless, the human eye only has a spatial resolution of 100 micron. Hence the considerable imaging resolution cannot be currently used.

Conversely, the method of this invention does not have any spatial resolution limits, except those possibly associated to image digitizing means.

Therefore, the spatial resolution limits of the human eye may be lowered by using appropriate image digitizing or digital sampling means, to potentially reach the spatial resolution available at the imaging stage.

Therefore, by using the method of this invention, it is possible to generate a digitized virtual image which consists of a two-dimensional, three-dimensional or multi-dimensional set, in which the virtual image is composed of image data for image unit dots relating to the spatial resolution below the one of the human eye.

The processing method essentially includes the same steps as described above, i.e. generating pixel encoding vectors and quality and type recognition processing, particularly for tissues, as described above. As described herein, the different object types or object qualities may be highlighted by appropriately changing the aspect of the pixel related thereto, e.g. by a suitable differentiated coloring arrangement.

From the set of pixel identification vectors, the pixel data matrix may be reconstructed, and said data may be used to control, for instance, a printer and/or a display screen.

The printer or display may be controlled in such a manner as to allow the individual pixels to be also displayed at the resolution of the human eye, e.g. by using an image variation in which the data of each pixel of the high resolution image, i.e. having a resolution below that of the human eye is used to control a unit group of pixels of the display or printer, whose pixels take the same aspect as the corresponding pixel to be displayed. The image is inflated rather than enlarged, each high resolution pixel being represented by displaying a pixel sub-matrix which comprises a sufficient number of pixels to generate an image portion having a resolution of the same order of magnitude as the one of the human eye or higher.

In the case of an image composed of pixels whose size corresponds to a resolution of 7 micron, it is possible to form unit groups of 14×14=196 pixels, thus simulating a resolution of 98 micron.

Here, the 196 pixels of the unit group are controlled to assume the same aspect as assigned to the corresponding high definition pixel, thereby generating an image point which is visible to the human eye.

Obviously, the above displaying steps allow to generate unit groups of high definition pixels which may also have a greater or smaller number of pixels, substantially corresponding to a greater or smaller enlargement of the individual high resolution pixels.

The enlargement factor may be also user-preset by possibly allowing to delimit or define an image portion whereto the enlargement displaying step is to be applied and to modify said image portion to be enlarged for successive and different enlargement steps with different enlargement and resolution factors.

The above description clearly shows that the recognition method according to this invention, based on the pixel encoding technique allows to process, evaluate or provide highly reliable indications, even regarding such information that is unrecognizable for the human eye.

Obviously, as for the method described above, multiple application fields may be provided, with particular reference to diagnostic image processing and to healthy or normal tissue or diseased tissue recognition, especially for benign and malignant tumor tissues.

In the latter application field, the improvement as described above allows to analyze the tissue type and to obtain indications regarding the presence of benign or malignant tumor tissues at very early stages which, at a resolution of 7 micron, are composed of a very small number of cells.

The invention claimed is:

1. A method for encoding pixels of digitized images comprising: providing one or more images comprising a set of image dots, named pixels in two-dimensional images and voxels in three-dimensional images, each of said pixels or voxels being represented by a set of values which correspond to a visual aspect of the pixel on a display screen or in a printed image, characterized in that the pixels (5) or voxels (14) of at least one portion of interest of the digital or digitized image or each pixel (5) or voxel (14) of the set of pixels or voxels which form the image is uniquely identified with a vector whose components are given by the data of the pixels (5) or voxels to be encoded (14) and by the data of at least one or at least some or of all of the pixels (1, 2, 3, 4, 6, 7, 8, 9; 1, 2, 3, 4, 5, 6, 7, 8, 9, 10, 11, 12, 13, 15, 16, 17, 18, 19, 20, 21, 22, 23, 24, 25, 26, 27) around the pixels to be encoded and arranged within a predetermined subset of pixels or voxels included in the whole set of pixels or voxels which form the image.

2. An encoding method as claimed in claim 1, characterized in that the components of the pixel (5) or voxel (14) identifying vector are determined by selecting, as pixels or voxels surrounding the pixel to be identified, all the pixels or voxels (1, 2, 3, 4, 6, 7, 8, 9; 1, 2, 3, 4, 5, 6 7, 8, 9, 10, 11, 12, 13, 15, 16, 17, 18, 19, 20, 21, 22, 23, 24, 25, 26, 27) that are directly adjacent to said pixel or voxel to be encoded.

3. A method as claimed in claim 1, characterized in that the components of the identification vector of a pixel (5) or voxel to be encoded (14) also consist of at least one or at least some or at least all of the pixels or voxels surrounding the pixels or voxels (1, 2, 3, 4, 6, 7, 8, 9; 1, 2, 3, 4, 5, 6, 7, 8, 9, 10, 11, 12, 13, 15, 16, 17, 18, 19, 20, 21, 22, 23, 24, 25, 26, 27) that are directly adjacent to said pixel (5) or voxel to be encoded (14).

4. A method as claimed in claim 1, characterized in that the components of the identification vector, corresponding to the pixel (5) or voxel to be encoded (14) and to the surrounding pixels or voxels (1, 2, 3, 4, 6, 7, 8, 9; 1, 2, 3, 4, 5, 6, 7, 8, 9, 10, 11, 12, 13, 15, 16, 17, 18, 19, 20, 21, 22, 23, 24, 25, 26, 27) are arranged in such a manner as to correspond to the distance relation of said pixels or voxels (1, 2, 3, 4, 6, 7, 8, 9; 1, 2, 3, 4, 5, 6, 7, 8, 9, 10, 11, 12, 13, 15, 16, 17, 18, 19, 20, 21, 22, 23, 24, 25, 26, 27) with one another and with the pixel (5) or voxel to be encoded (14), with reference to a predetermined reading sequence of surrounding pixels or voxels (1, 2, 3, 4, 6, 7, 8, 9; 1, 2, 3, 4, 5, 6, 7, 8, 9, 10, 11, 12, 13, 15, 16, 17, 18, 19, 20, 21, 22, 23, 24, 25, 26, 27), selected for forming said identification vector and the pixel (5) of voxel to be encoded (14).

5. A method as claimed in claim 1, characterized in that the components of the identification vector are arranged in such a manner that the pixel (5) or voxel to be encoded (14) has a central position which corresponds to the one taken in the image pixel or voxel set, related to the pixels or voxels (1, 2, 3, 4, 6, 7, 8, 9; 1, 2, 3, 4, 5, 6, the pixel (5) or voxel to be encoded (14) which have been selected for determining the identification vector components.

6. A method as claimed in claim 1, characterized in that it includes the step of encoding a sequence of digital or digitized images of a single subject and relating to a single frame of said subject, which sequence includes at least two images acquired with a time interval therebetween, which identification vector for a pixel (5) or voxel (14) to be encoded, having the same position in the pixel matrix which forms said sequence images, is formed by the value of said pixel (5) or voxel to be encoded (14) and by the surrounding pixels or voxels selected to form the components of said identification vector for each image that is part of said image sequence.

7. A method as claimed in claim 6, characterized in that the identification vector for a pixel (5) or voxel to be encoded (14) within a sequence of digital or digitized images includes the values of said pixel or voxel to be encoded and of the pixels or voxels selected to form the components of said identification vector of all the images of said sequence, the values of the pixel (5) or voxel (14) to be encoded and of the pixels or voxels around it, selected to form the components of the identification vectors, being ordered with respect to the instant whereat the individual images of the sequence were acquired, in such a manner as to form subsets of identification vector components, referred to the same image of the image sequence or to the same acquisition instant.

8. A method as claimed in claim 7, wherein the subsets of identification vector components referred to the different images of an image sequence are successively ordered with reference to the instant whereat the corresponding image of the image sequence to be encoded was acquired.

9. A method of processing digital or digitized images, operating based on image pixel or voxel encoding as claimed in claim 1, and characterized in that it includes generation of a teaching database and teaching of the processing system, including the following steps:
  encoding a predetermined number of digital or digitized images into pixel or voxel identifying vectors;
  uniquely associating each identification vector to the corresponding type of object or to the corresponding quality, as determined by traditional image analysis and actually reproduced by each pixel or voxel encoded by the corresponding identification vector, with reference to a list of predetermined different types or qualities
  generating a teaching database for a processing system, which database comprises the binomials formed by said identification vectors and by the associated type or quality of the object reproduced by the corresponding pixel or voxel;
  actually teaching the processing system, by entering and loading the teaching database therein or by allowing the processing system to access the database;
  a repeatable processing step for different images or image sequences with no need to repeat the teaching step, and comprising the following steps:
  encoding the pixels or voxels of a not otherwise evaluated image by identification vectors associated to each pixel or voxel;
  entering said image pixel or voxel identifying vectors in the processing system to obtain, at the output of said processing system and as a result of the processing, the type or quality of the object represented by each image pixel or voxel, with reference to the object types or qualities included in the teaching database.

10. An image processing method as claimed in claim 9, characterized in that the processing system consists of an algorithm for comparing the pixel identifying vectors of the teaching database with the pixel identifying vectors of the encoded images to be processed or of the sequence of encoded images to be processed.

11. A method as claimed in claim 9, characterized in that the processing system consists of a discriminating algorithm, of the type known as LDA.

12. A method as claimed in claim 9, characterized in that the processing system consists of an algorithm known as a neural network.

13. A method as claimed in claim 9, characterized in that the pixels or voxels of the processed image wherefor an object type or quality has been recognized are displayed differentially from each other and from the image for each object type or quality option.

14. A method as claimed in claim 13, characterized in that the pixels or voxels of the processed image wherefor an object type or quality has been recognized are displayed differentially from each other and from the image for each object type or quality option, and over the original image.

15. A method as claimed in claim 14, characterized in that the original image is displayed in a monochromatic mode, particular in black and white or a gray scale.

16. A method as claimed in claim 9, characterized in that the results of image processing are stored in the teaching database for the processing system.

17. A method as claimed in claim 16, characterized in that, before being stored in the teaching database, the image processing results are validated by a visual control and/or other analysis means.

18. A method as claimed in claim 16, characterized in that image processing results are stored in the form of identification vectors for the pixels or voxels of the processed image, associated to the object type or quality assigned thereto upon processing.

19. A method as claimed in claim 9, characterized in that it is a method for recognizing types of objects reproduced by image pixels or voxels.

20. A method as claimed in claim 9, characterized in that it is a method for measuring contrast agent perfusion, wherein a sequence of ultrasound or Nuclear Magnetic Resonance images of a predetermined anatomic part of a patient are detected after injecting so called contrast agents in said anatomic part, which method includes the following steps:
    generating a teaching database for the expert processing system comprising identification vectors for pixels or voxels or image sequences obtained when contrast agents are present, whereto a quality or type o perfusion behavior is associated, among different typical perfusion types or qualities;
    actually teaching the processing system, by entering or handling data of the teaching database;
    acquiring a sequence of images of an anatomic part after injecting contrast agents therein, and encoding the pixels or voxels of the images of said sequence, into identification vectors for the pixels of said image sequence;
    processing by the identification vector processing algorithm, which associates, based in the teaching database, a perfusion behavior type or a perfusion quality to each identification vector, hence to each pixel or voxel of the image sequence;
    displaying the image sequence, and highlighting the pixels or voxels associated to the different perfusion behavior qualities or types by means for unique visual aspect characterization of said pixels or voxels.

21. An image processing method as claimed in claim 9, which includes an image pixel or voxel encoding method, characterized in that it is a method for recognizing and displaying parts of moving organs or physiological structures, particularly of the heart, wherein a sequence of ultrasound or radiographic or Nuclear Magnetic Resonance images of the heart or of any other organ or physiological structure is acquired, which method includes the following steps:
    generating a teaching database in which each identification vector for pixels or voxels of a. plurality of image sequences of the heart or any other organ or physiological structure is assigned the type or quality of what is reproduced by the corresponding pixel or voxel;
    actually teaching the processing system, by entering or handling data of the teaching database;
    encoding a sequence of images of the heart or any other organ or physiological structure for further processing;
    processing said encoded sequence of images so that the processing algorithm may assign, based on the teaching database, the type or quality reproduced by each pixel or voxel of the encoded image sequence;
    displaying the result and visually highlighting the pixels of voxels corresponding to specific types or qualities by uniquely changing the aspect of these pixels of voxels according to each of the specific types or qualities.

22. A method as claimed in claim 9, wherein the following steps are included:
    generating a teaching database by encoding image pixels or voxels into identification vectors, and wherein each identification vector for the pixels or voxels of said images is assigned the type or quality which defines the presence or absence of the image defect or aberration depending on whether the corresponding pixel or voxel reproduces or has or not said aberration or said defect;
    actually teaching the processing system, by entering or handling data of the teaching database;
    encoding images;
    processing said encoded images so that the processing algorithm may assign, based on the teaching database, the type or quality which defines the presence or absence of an image defect or aberration for each pixel or voxel of the encoded images;
    displaying the result and visually highlighting, by aspect change arrangements, the pixel/s or voxel/s which have been assigned the type which defines the presence of aberrations or defects and possibly indicating the quality of the aberration or defect assigned to a pixel or voxel, as distinct from the one assigned to other pixels or voxels, by further aspect differentiation of the pixel/s or voxel/s, uniquely related to the different defect or aberration qualities.

23. A method as claimed in claim 22, characterized in that it further includes defect removal, according to the following steps:
    adding to the teaching database pairs of encoded images, which have or do not have image defects or aberrations, by associating the identification vectors with the corresponding types defining the presence or absence of pixel aberration;
    encoding the pixels or voxels of an image and processing the latter to assign the type that defines the absence of presence of aberrations or defects, and possibly the quality of said aberrations or defects to each pixel or voxel of the image;
    correcting the aspect of the pixels or voxels which have been found to have defects or aberrations by assigning them the aspect of the defect- or aberration-free pixels or voxels of the image, which is coupled, in the teaching database, to the corresponding image which has said aberrations or defects.

24. A method as claimed in claim 22, characterized in that the processed images are previously or subsequently processed for specific recognition of the object types represented by the pixels.

25. A method as claimed in claim 22, characterized in that the type of defect or aberration is a defocusing defect and/or an artifact and/or a wrong exposure and/or a defective development.

26. A method as claimed in claim 9, characterized in that it is a method of overlaying digital or digitized images of the same subject, obtained by different imaging techniques, which includes the following steps:
   encoding each of the images of the same subject, obtained with different imaging techniques,
   processing each of the images of the same subject, obtained with different imaging techniques, for recognizing types of objects or qualities;
   combining the information provided by the pixels of the different images, which are assigned to the same type of object, into a single image.

27. A method as claimed in claim 1, characterized in that it is a method for processing digital or digitized diagnostic images, aimed at the recognition of at least one type of tissue or anatomic or physiologic object or one quality thereof.

28. A method as claimed in claim 27, characterized in that it is a diagnostic image processing method for recognizing and discriminating benign tumor tissues and malignant tumor tissues, as reproduced by the pixels or voxels of the diagnostic images, the teaching database being composed of identification vectors for image pixels or voxels that represent said malignant and benign tumor tissues, uniquely associated to the corresponding tissue type.

29. A method as claimed in claim 28, characterized in that it is a method for recognizing and discriminating benign tumor tissues, malignant tumor tissues and normal tissues, as reproduced by the pixels or voxels of the diagnostic images, the teaching database being composed of identification vectors for image pixels or voxels that represent said malignant and benign tumor and normal tissues, which vectors are uniquely associated to the corresponding tissue type reproduced by the pixels or voxels encoded into said vectors.

30. A method as claimed in claim 29, characterized in that it is a method for recognizing and discriminating benign tumor tissues, malignant tumor tissues, normal tissues and muscular tissues as reproduced by the pixels or voxels of the diagnostic images to be processed, the teaching database being composed of identification vectors for image pixels or voxels that represent malignant and benign tumor tissues, normal and muscular tissues, which vectors are uniquely associated to the corresponding tissue type reproduced by the pixels or voxels encoded into said vectors.

31. A method as claimed in claim 28, characterized in that it is a method for recognizing and discriminating benign tumor tissues and/or malignant tumor tissues and/or normal tissues and/or muscular tissues and image background, as reproduced by the pixels or voxels of the diagnostic images to be processed, the teaching database being composed of identification vectors for image pixels or voxels that represent malignant and/or benign tumor tissues, and/or normal and/or muscular tissues and image background, which vectors are uniquely associated to the corresponding tissue type or background reproduced by the pixels or voxels encoded into said vectors.

32. A method as claimed in claim 1, characterized in that the digitized image is an image whose pixel size corresponds to a high resolution, below human eye resolution, the pixel data which are processed for recognition, being used to control all the pixels of a high resolution pixel unit group which has such a number of pixels that the aspect of all the pixels of each pixel unit group is identical to that of the high definition pixel associated thereto and the displayed or printed image of said pixel unit group may be viewed or detected at the human eye resolution or worse.

33. A method as claimed in claim 32, characterized in that the number of high definition pixels which form the pixel unit group is adjustable and allows to define different enlargement levels.

34. A method according to claim 33, charaterised in that as a value of the minimum image area it is used the mean of the brightness values of the single pixels forming the minimum image area and/or the variance thereof and/or additionally the mean and or the variance value of the colour values of the single pixels.

35. A method according to claim 1 characterised in that instead of considering an image formed by single pixels, for coding purposes a minimum image area of different size may be defined which is formed by a predefinite certain number of adjacent pixels, the value of the said minimum image area formed by the said certain number of adjacent pixels being calculated as a linear or non linear combination and/or as the value of one or more statistical functions of the of the brightness and or color values of the single pixels forming the said minimum image area.

36. A method according to claim 35, characterized in that also the time dependency of the values relating to brightness and/or color of the single pixels forming the minimum image area is added, the time dependency of the combinations and/or of the statistical functions of the brightness and or color values of the single pixels being used.

37. A method according to claim 35, characterized in that there are defined minimum neighborhood image area zones of the minimum image area to be coded each of which minimum neighborhood image area zones may be formed by a single selected pixels in the neighborhood of the minimum image area to be coded or as a certain number of said pixels in the neighborhood of the said minimum image area to be coded.

38. A method according to claim 37, characterized in that the minimum neighborhood image area ones of the minimum image area to be coded have a number of pixels for each zone which is identical or different form the number of pixels forming the minimum image area to be coded.

* * * * *

UNITED STATES PATENT AND TRADEMARK OFFICE
CERTIFICATE OF CORRECTION

PATENT NO. : 7,672,517 B2 Page 1 of 1
APPLICATION NO. : 10/516879
DATED : March 2, 2010
INVENTOR(S) : Paolo Massimo Buscema It is certified that error appears in the above-identified patent and that said Letters Patent is hereby corrected as shown below:

TITLE PAGE:

Item [73]: --Semelon-- should read --Semeion--

Signed and Sealed this

Sixth Day of July, 2010

David J. Kappos
*Director of the United States Patent and Trademark Office*